(12) United States Patent
Moritz et al.

(10) Patent No.: US 10,430,565 B2
(45) Date of Patent: *Oct. 1, 2019

(54) SECURING MICROPROCESSORS AGAINST INFORMATION LEAKAGE AND PHYSICAL TAMPERING

(71) Applicant: BlueRISC, Inc., Amherst, MA (US)

(72) Inventors: Csaba Andras Moritz, Amherst, MA (US); Saurabh Chheda, Santa Clara, CA (US); Kristopher Carver, Belchertown, MA (US)

(73) Assignee: BlueRISC, Inc., Amherst, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/906,306

(22) Filed: Feb. 27, 2018

(65) Prior Publication Data
US 2018/0349573 A1    Dec. 6, 2018

Related U.S. Application Data

(63) Continuation of application No. 14/750,194, filed on Jun. 25, 2015, now Pat. No. 9,940,445, which is a
(Continued)

(51) Int. Cl.
*G06F 21/12*    (2013.01)
*G06F 9/30*    (2018.01)
(Continued)

(52) U.S. Cl.
CPC .......... *G06F 21/12* (2013.01); *G06F 9/30003* (2013.01); *G06F 9/3017* (2013.01);
(Continued)

(58) Field of Classification Search
None
See application file for complete search history.

(56) References Cited

U.S. PATENT DOCUMENTS

| 3,603,934 A | 9/1971 | Heath, Jr. et al. |
| 4,003,033 A | 1/1977 | O'Keefe et al. |

(Continued)

FOREIGN PATENT DOCUMENTS

| EP | 0314277 A2 | 5/1989 |
| EP | 0552816 A2 | 7/1993 |

(Continued)

OTHER PUBLICATIONS

Abraham et al., "Automatic and Efficient Evaluation of Memory Hierarchies for Embedded Systems," micro, p. 114, 32nd Annual IEEE/ACM International Symposium on Microarchitecture (MICRO'99), (1999).

(Continued)

*Primary Examiner* — Kaveh Abrishamkar
(74) *Attorney, Agent, or Firm* — Burns & Levinson, LLP

(57) ABSTRACT

A processor system comprising: performing a compilation process on a computer program; encoding an instruction with a selected encoding; encoding the security mutation information in an instruction set architecture of a processor; and executing a compiled computer program in the processor using an added mutation instruction, wherein executing comprises executing a mutation instruction to enable decoding another instruction. A processor system with a random instruction encoding and randomized execution, providing effective defense against offline and runtime security attacks including software and hardware reverse engineering, invasive microprobing, fault injection, and high-order differential and electromagnetic power analysis.

34 Claims, 6 Drawing Sheets

Related U.S. Application Data continuation of application No. 13/685,953, filed on Nov. 27, 2012, now Pat. No. 9,069,938, which is a continuation of application No. 11/981,178, filed on Oct. 31, 2007, now abandoned.

(60) Provisional application No. 60/856,593, filed on Nov. 3, 2006.

(51) Int. Cl.
*G06F 9/38* (2018.01)
*G06F 21/55* (2013.01)
*G06F 21/75* (2013.01)
*G06F 8/41* (2018.01)

(52) U.S. Cl.
CPC ........ *G06F 9/30145* (2013.01); *G06F 9/3846* (2013.01); *G06F 9/3879* (2013.01); *G06F 21/55* (2013.01); *G06F 21/755* (2017.08); *G06F 8/41* (2013.01); *G06F 2221/033* (2013.01)

(56) References Cited

U.S. PATENT DOCUMENTS

| | | |
|---|---|---|
| 4,037,090 A | 7/1977 | Raymond, Jr. |
| 4,042,972 A | 8/1977 | Gruner et al. |
| 4,050,058 A | 9/1977 | Garlic |
| 4,067,059 A | 1/1978 | Derchak |
| 4,079,455 A | 3/1978 | Ozga |
| 4,101,960 A | 7/1978 | Stokes et al. |
| 4,110,822 A | 8/1978 | Porter et al. |
| 4,125,871 A | 11/1978 | Martin |
| 4,128,873 A | 12/1978 | Lamiaux |
| 4,138,720 A | 2/1979 | Chu et al. |
| 4,181,942 A | 1/1980 | Forster et al. |
| 4,255,785 A | 3/1981 | Chamberlin |
| 4,354,228 A | 10/1982 | Moore et al. |
| 4,376,977 A | 3/1983 | Bruinshorst |
| 4,382,279 A | 5/1983 | Ugon |
| 4,403,303 A | 9/1983 | Howes et al. |
| 4,410,939 A | 10/1983 | Kawakami |
| 4,434,461 A | 2/1984 | Puhl |
| 4,435,758 A | 3/1984 | Lorie et al. |
| 4,450,519 A | 5/1984 | Guttag et al. |
| 4,463,421 A | 7/1984 | Laws |
| 4,538,239 A | 8/1985 | Magar |
| 4,541,045 A | 9/1985 | Kromer, III |
| 4,562,537 A | 12/1985 | Barnett et al. |
| 4,577,282 A | 3/1986 | Caudel et al. |
| 4,592,013 A | 5/1986 | Prame |
| 4,604,695 A | 8/1986 | Widen et al. |
| 4,607,332 A | 8/1986 | Goldberg |
| 4,626,988 A | 12/1986 | George |
| 4,649,471 A | 3/1987 | Briggs et al. |
| 4,665,495 A | 5/1987 | Thaden |
| 4,679,140 A | 7/1987 | Gotou et al. |
| 4,709,329 A | 11/1987 | Hecker |
| 4,713,749 A | 12/1987 | Magar et al. |
| 4,714,994 A | 12/1987 | Oklobdzija et al. |
| 4,720,812 A | 1/1988 | Kao et al. |
| 4,772,888 A | 9/1988 | Kimura |
| 4,773,038 A | 9/1988 | Hillis et al. |
| 4,777,591 A | 10/1988 | Chang et al. |
| 4,787,032 A | 11/1988 | Gulley |
| 4,803,621 A | 2/1989 | Kelly |
| 4,860,198 A | 8/1989 | Takenaka |
| 4,870,562 A | 9/1989 | Kimoto et al. |
| 4,873,626 A | 10/1989 | Gifford |
| 4,931,986 A | 6/1990 | Daniel et al. |
| 4,992,933 A | 2/1991 | Taylor |
| 5,021,993 A | 6/1991 | Matoba et al. |
| 5,036,460 A | 7/1991 | Takahira et al. |
| 5,038,282 A | 8/1991 | Gilbert et al. |
| 5,045,995 A | 9/1991 | Levinthal et al. |
| 5,070,451 A | 12/1991 | Moore et al. |
| 5,111,389 A | 5/1992 | McAuliffe et al. |
| 5,121,498 A | 6/1992 | Gilbert et al. |
| 5,127,091 A | 6/1992 | Boufarah et al. |
| 5,136,697 A | 8/1992 | Johnson |
| 5,193,202 A | 3/1993 | Jackson et al. |
| 5,224,214 A | 6/1993 | Rosich |
| 5,230,079 A | 7/1993 | Grondalski |
| 5,276,895 A | 1/1994 | Grondalski |
| 5,361,367 A | 11/1994 | Fijany et al. |
| 5,410,669 A | 4/1995 | Biggs et al. |
| 5,430,854 A | 7/1995 | Sprague et al. |
| 5,440,749 A | 8/1995 | Moore et al. |
| 5,479,624 A | 12/1995 | Lee |
| 5,481,684 A | 1/1996 | Richter et al. |
| 5,481,693 A | 1/1996 | Blomgren et al. |
| 5,497,478 A | 3/1996 | Murata |
| 5,524,223 A | 6/1996 | Lazaravich et al. |
| 5,542,059 A | 7/1996 | Blomgren |
| 5,542,074 A | 7/1996 | Kim et al. |
| 5,551,039 A | 8/1996 | Weinberg et al. |
| 5,555,386 A | 9/1996 | Nomura |
| 5,555,428 A | 9/1996 | Radigan et al. |
| 5,560,028 A | 9/1996 | Sachs et al. |
| 5,579,520 A | 11/1996 | Bennett |
| 5,590,283 A | 12/1996 | Hillis et al. |
| 5,590,356 A | 12/1996 | Gilbert |
| 5,598,546 A | 1/1997 | Blomgren |
| 5,604,913 A | 2/1997 | Koyanagi et al. |
| 5,608,886 A | 3/1997 | Blomgren et al. |
| 5,630,143 A | 5/1997 | Maher et al. |
| 5,637,932 A | 6/1997 | Koreeda et al. |
| 5,638,525 A | 6/1997 | Hammond et al. |
| 5,638,533 A | 6/1997 | Law |
| 5,652,894 A | 7/1997 | Hu et al. |
| 5,655,122 A | 8/1997 | Wu |
| 5,655,124 A | 8/1997 | Lin |
| 5,659,722 A | 8/1997 | Blaner et al. |
| 5,659,778 A | 8/1997 | Gingold et al. |
| 5,664,950 A | 9/1997 | Lawrence |
| 5,666,519 A | 9/1997 | Hayden |
| 5,684,973 A | 11/1997 | Sullivan et al. |
| 5,696,958 A | 12/1997 | Mowry et al. |
| 5,704,053 A | 12/1997 | Santhanam |
| 5,721,893 A | 2/1998 | Holler et al. |
| 5,727,229 A | 3/1998 | Kan et al. |
| 5,737,572 A | 4/1998 | Nunziata |
| 5,737,749 A | 4/1998 | Patel et al. |
| 5,742,804 A | 4/1998 | Yeh et al. |
| 5,752,068 A | 5/1998 | Gilbert |
| 5,758,112 A | 5/1998 | Yeager et al. |
| 5,758,176 A | 5/1998 | Agarwal et al. |
| 5,774,685 A | 6/1998 | Dubey |
| 5,774,686 A | 6/1998 | Hammond et al. |
| 5,778,241 A | 7/1998 | Bindloss et al. |
| 5,781,750 A | 7/1998 | Blomgren et al. |
| 5,790,877 A | 8/1998 | Nishiyama et al. |
| 5,794,062 A | 8/1998 | Baxter |
| 5,805,907 A | 9/1998 | Loper et al. |
| 5,805,915 A | 9/1998 | Wilkinson et al. |
| 5,812,811 A * | 9/1998 | Dubey .................. G06F 9/3009 712/200 |
| 5,822,606 A | 10/1998 | Morton |
| 5,848,290 A | 12/1998 | Yoshida et al. |
| 5,854,934 A | 12/1998 | Hsu et al. |
| 5,857,104 A | 1/1999 | Natarjan et al. |
| 5,864,697 A | 1/1999 | Shiell |
| 5,864,707 A | 1/1999 | Tran et al. |
| 5,870,581 A | 2/1999 | Redford |
| 5,872,987 A | 2/1999 | Wade et al. |
| 5,875,324 A | 2/1999 | Tran et al. |
| 5,875,464 A | 2/1999 | Kirk |
| 5,884,057 A | 3/1999 | Blomgren et al. |
| 5,887,166 A | 3/1999 | Mallick et al. |
| 5,903,750 A | 5/1999 | Yeh et al. |
| 5,924,117 A | 7/1999 | Luick |
| 5,930,490 A | 7/1999 | Bartkowiak |
| 5,930,509 A | 7/1999 | Yates et al. |
| 5,933,650 A | 8/1999 | van Hook et al. |

(56) References Cited

U.S. PATENT DOCUMENTS

| | | |
|---|---|---|
| 5,933,860 A | 8/1999 | Emer et al. |
| 5,946,222 A | 8/1999 | Redford |
| 5,949,995 A | 9/1999 | Freeman |
| 5,960,467 A | 9/1999 | Mahalingaiah et al. |
| 5,966,544 A | 10/1999 | Sager |
| 5,991,857 A | 11/1999 | Koetje et al. |
| 5,996,061 A | 11/1999 | Lopez-Aguado et al. |
| 6,006,328 A | 12/1999 | Drake |
| 6,021,484 A | 2/2000 | Park |
| 6,044,469 A | 3/2000 | Horstmann |
| 6,049,330 A | 4/2000 | Redford |
| 6,052,703 A | 4/2000 | Redford |
| 6,058,469 A | 5/2000 | Baxter |
| 6,067,609 A | 5/2000 | Meeker et al. |
| 6,067,622 A | 5/2000 | Moore |
| 6,076,158 A | 6/2000 | Sites et al. |
| 6,078,745 A | 6/2000 | De Greef et al. |
| 6,089,460 A | 7/2000 | Hazama |
| 6,105,139 A | 8/2000 | Dey et al. |
| 6,108,775 A | 8/2000 | Shiell et al. |
| 6,119,205 A | 9/2000 | Wicki et al. |
| 6,121,905 A | 9/2000 | Redford |
| 6,130,631 A | 10/2000 | Redford |
| 6,175,892 B1 | 1/2001 | Sazzad et al. |
| 6,178,498 B1 | 1/2001 | Sharangpani et al. |
| 6,211,864 B1 | 4/2001 | Redford |
| 6,212,542 B1 | 4/2001 | Kahle et al. |
| 6,216,223 B1 | 4/2001 | Revilla et al. |
| 6,219,796 B1 | 4/2001 | Bartley |
| 6,256,743 B1 | 7/2001 | Lin |
| 6,272,512 B1 | 8/2001 | Golliver et al. |
| 6,272,676 B1 | 8/2001 | Haghighat et al. |
| 6,282,623 B1 | 8/2001 | Halahmi et al. |
| 6,282,628 B1 | 8/2001 | Dubey et al. |
| 6,282,639 B1 | 8/2001 | Puziol et al. |
| 6,286,135 B1 | 9/2001 | Santhanam |
| 6,289,505 B1 | 9/2001 | Goebel |
| 6,292,879 B1 | 9/2001 | Fong |
| 6,301,705 B1 | 10/2001 | Doshi et al. |
| 6,327,661 B1 * | 12/2001 | Kocher ................ G06F 21/602 380/28 |
| 6,334,175 B1 | 12/2001 | Chih |
| 6,341,371 B1 | 1/2002 | Tandri |
| 6,381,668 B1 | 4/2002 | Lunteren |
| 6,385,720 B1 | 5/2002 | Tanaka et al. |
| 6,393,520 B2 | 5/2002 | Yoshikawa et al. |
| 6,404,439 B1 | 6/2002 | Coulombe et al. |
| 6,412,105 B1 | 6/2002 | Maslennikov et al. |
| 6,430,674 B1 | 8/2002 | Trivedi et al. |
| 6,430,693 B2 | 8/2002 | Lin |
| 6,446,181 B1 | 9/2002 | Ramagopal et al. |
| 6,452,864 B1 | 9/2002 | Condemi et al. |
| 6,473,339 B2 | 10/2002 | De Ambroggi et al. |
| 6,477,646 B1 | 11/2002 | Krishna et al. |
| 6,487,640 B1 | 11/2002 | Lipasti |
| 6,487,651 B1 | 11/2002 | Jackson et al. |
| 6,502,188 B1 | 12/2002 | Zuraski, Jr. et al. |
| 6,529,943 B1 | 3/2003 | Ohi |
| 6,539,543 B1 | 3/2003 | Guffens et al. |
| 6,550,004 B1 | 4/2003 | Henry et al. |
| 6,560,776 B1 | 5/2003 | Breggin et al. |
| 6,571,331 B2 | 5/2003 | Henry et al. |
| 6,574,740 B1 | 6/2003 | Odaohhara et al. |
| 6,601,161 B2 | 7/2003 | Rappoport et al. |
| 6,611,910 B2 | 8/2003 | Sharangpani et al. |
| 6,625,740 B1 | 9/2003 | Datar et al. |
| 6,643,739 B2 | 11/2003 | Van De Waerdt et al. |
| 6,658,578 B1 | 12/2003 | Laurenti et al. |
| 6,671,798 B1 | 12/2003 | Puziol et al. |
| 6,675,305 B1 | 1/2004 | Mohammad |
| 6,687,838 B2 | 2/2004 | Orenstien et al. |
| 6,732,253 B1 | 5/2004 | Redford |
| 6,772,323 B2 | 8/2004 | Krishnan et al. |
| 6,795,781 B2 | 9/2004 | Aldridge et al. |
| 6,813,693 B2 | 11/2004 | Chilimbi |
| 6,826,652 B1 | 11/2004 | Chauvel et al. |
| 6,931,518 B1 | 8/2005 | Redford |
| 6,934,865 B2 | 8/2005 | Moritz et al. |
| 6,970,985 B2 | 11/2005 | Moritz |
| 6,988,183 B1 | 1/2006 | Wong |
| 7,024,393 B1 | 4/2006 | Peinado et al. |
| 7,036,118 B1 | 4/2006 | Ulery et al. |
| 7,080,366 B2 | 7/2006 | Kramskoy et al. |
| 7,089,594 B2 | 8/2006 | Lal et al. |
| 7,162,617 B2 | 1/2007 | Ota et al. |
| 7,185,215 B2 | 2/2007 | Cook et al. |
| 7,278,136 B2 | 10/2007 | Moritz et al. |
| 7,293,164 B2 | 11/2007 | DeWitt, Jr. et al. |
| 7,299,500 B1 | 11/2007 | Klebe et al. |
| 7,430,670 B1 * | 9/2008 | Horning ................ G06F 21/14 713/190 |
| 7,467,377 B2 | 12/2008 | Wu et al. |
| 7,487,340 B2 | 2/2009 | Luick |
| 7,493,607 B2 | 2/2009 | Moritz |
| 7,564,345 B2 * | 7/2009 | Devadas ................ G06F 21/31 340/10.1 |
| 7,600,265 B2 | 10/2009 | Davydov et al. |
| 7,613,921 B2 | 11/2009 | Scaralata |
| 7,639,805 B2 | 12/2009 | Li et al. |
| 7,676,661 B1 | 3/2010 | Mohan et al. |
| 7,996,671 B2 | 8/2011 | Chheda et al. |
| 9,069,938 B2 * | 6/2015 | Moritz ................ G06F 9/30003 |
| 9,940,445 B2 * | 4/2018 | Moritz ................ G06F 9/30003 |
| 2001/0032309 A1 | 10/2001 | Henry et al. |
| 2001/0037450 A1 | 11/2001 | Metlitski et al. |
| 2001/0044891 A1 | 11/2001 | McGrath et al. |
| 2001/0056531 A1 | 12/2001 | McFarling |
| 2002/0073301 A1 | 6/2002 | Kahle et al. |
| 2002/0095566 A1 | 7/2002 | Sharangpani et al. |
| 2002/0104077 A1 | 8/2002 | Charnell et al. |
| 2002/0116578 A1 | 8/2002 | Sakai et al. |
| 2003/0014742 A1 | 1/2003 | Seth et al. |
| 2003/0041230 A1 | 2/2003 | Rappoport et al. |
| 2003/0066061 A1 | 4/2003 | Wu et al. |
| 2004/0010679 A1 | 1/2004 | Moritz et al. |
| 2004/0010782 A1 | 1/2004 | Moritz |
| 2004/0010783 A1 | 1/2004 | Moritz et al. |
| 2004/0015923 A1 | 1/2004 | Hemsing et al. |
| 2004/0139340 A1 * | 7/2004 | Johnson ................ G06F 21/14 713/194 |
| 2004/0154011 A1 | 8/2004 | Wang et al. |
| 2004/0158691 A1 | 8/2004 | Redford |
| 2004/0162964 A1 | 8/2004 | Ota et al. |
| 2004/0205740 A1 | 10/2004 | Lavery et al. |
| 2005/0055678 A1 | 3/2005 | Sakai |
| 2005/0066153 A1 | 3/2005 | Sharangpani et al. |
| 2005/0108507 A1 | 5/2005 | Chheda et al. |
| 2005/0114850 A1 | 5/2005 | Chheda et al. |
| 2005/0154867 A1 | 7/2005 | DeWitt et al. |
| 2005/0172277 A1 | 8/2005 | Chheda et al. |
| 2005/0210249 A1 | 9/2005 | Lee et al. |
| 2005/0262332 A1 | 11/2005 | Rappoport et al. |
| 2006/0179329 A1 | 8/2006 | Terechko et al. |
| 2007/0294181 A1 | 12/2007 | Chheda et al. |
| 2008/0126766 A1 | 5/2008 | Chheda et al. |
| 2009/0300590 A1 | 12/2009 | Moritz |
| 2011/0258416 A1 | 10/2011 | Moritz |
| 2012/0102336 A1 | 4/2012 | Chheda et al. |

FOREIGN PATENT DOCUMENTS

| | | |
|---|---|---|
| EP | 0679991 A1 | 11/1995 |
| EP | 0681236 A1 | 11/1995 |
| EP | 0945783 A2 | 9/1999 |
| GB | 2201015 A | 8/1988 |
| JP | 10289305 | 10/1998 |
| JP | 20027359 | 1/2002 |
| WO | WO-87/00318 A1 | 1/1987 |
| WO | WO-91/19269 A1 | 12/1991 |
| WO | WO-93/04438 A1 | 3/1993 |
| WO | WO-99/14685 A1 | 3/1999 |
| WO | WO-02/039271 | 5/2002 |
| WO | WO-02/039272 | 5/2002 |

(56) References Cited

FOREIGN PATENT DOCUMENTS

| WO | WO-02/044895 | 6/2002 |
| WO | WO-02/046885 | 6/2002 |
| WO | WO-04/006060 A2 | 1/2004 |

OTHER PUBLICATIONS

Abstract search, "SIMD Processor" (dated Mar. 21, 2003).
Actel corporation, "Design Security in Nonvolatile Flash and Antifuse FPGAs Security Backgrounder", [online] Retrieved from the Internet: URL<http://www.actel.com/documents/DesignSecurity_WP.pdf> [retrieved on Feb. 22, 2011] (2002).
U.S. Appl. No. 10/191,646.
U.S. Appl. No. 10/191,774.
U.S. Appl. No. 10/191,775.
U.S. Appl. No. 10/191,946.
U.S. Appl. No. 10/967,989.
U.S. Appl. No. 10/987,374.
U.S. Appl. No. 12/347,252.
Advanced Micro Devices, Inc., "Quantispeed Architecture", AMO White Paper, Sunnyvale, CA, (2001).
Aho et al., Compilers: Principles, Techniques and Tools, Addison-Wesley, Reading, MA (1988).
Akkar et al., "An Implementation of DES and AES, Secure Against Some Attacks", CHES2001, LNCS 2162, pp. 309-318 (2001).
Al-Tawil, K. et al. "Performance Modeling and Evaluation of MPI", Journal of Parallel and Distributed Computing, vol. 61, pp. 202-223, (2001).
Albonesi et al., "Selective Cache Ways: On-Demand Cache Resource Allocation", Proceedings of the 32nd International Symposium on Microarchitecture, pp. 248-259 (Nov. 1999).
Andersen, L., "Program Analysis and Specialization for the C Programming Language", Ph.D. Thesis, DIKU, Univ. of Copenhagen (May 1994).
Anderson et al., "Physical Design of a Fourth-Generation Power GHz Microprocessor", Digest of Technical Papers, IEEE Int'l Solid State Circuits Conf., pp. 232-233 and 451 (2001).
ANSI x9.17, "American national standard for financial institution key management (wholesale)", Tech. Rep., American Bankers Assoc. (1985).
Antoniou, A., "Digital Filters: Analysis, Design & Applications", McGraw-Hill, New York, NY (1993).
Aragon, et al., "Power-aware Control Speculation Through Selective Throttling," Proceedings of 9th International Symposium on High Performance Computer Architecture (HPCA), (2003).
ARM Architecture Reference Manual—ARM DOI 0100E, pp. A4-28 and A4-82 (( c) 1996-2000).
Ashok et al., "Cool-Mem: Combining Statically Speculative Memory Accessing with Selective Address Translation for Energy Efficiency", in Proceedings of the 10th international conference on Architectural Support for Programming Languages and Operating Systems (ASPLOS 2002), pp. 133-143, San Jose, CA, (Oct. 2002).
Ashok et al., "Coupling Compiler-Enabled and Conventional Memory Accessing for Energy Efficiency", ACM Transactions on Computer Systems (TOCS), vol. 22, No. 2, pp. 180-213, (May 2004).
Ashok et al., "Network Software: From NCP to Ubiquitous Computing", Encyclopedia of Life Support Systems, (2001).
Athanas et al., "Processor Reconfiguration Through Instruction-Set Metamorphosis", IEEE/Computer Magazine, v. 26(3), oas. 11-18 (1993).
Babb et al., "Parallelizing Applications into Silicon", The 7th Annual IEEE Symposium on Field-Programmable Custom Computing Machines, FCCM'99, Napa, CA (Apr. 1999).
Bahar et al., "Power and Energy Reduction Via Pipeline Balancing", IEEE, 12 pgs., (2001).
Banerjee et al., "Fast execution of loops with IF statements", IEEE vol. 84, pp. 126-132 (1984).
Baniasadi et al., "Instruction Flow-Based Front-end Throttling for Power-Aware High-Performance Processors", (ISLPED '01), ACM, pp. 16-21, (2001).

Bechade et al., "A 32b 66MHz 1.8W Microprocessor", Digest of Technical Papers, IEEE, pp. 208-209, (1994).
Bellas et al., "Architectural and Compiler Techniques for Energy Reduction in High-Performance Microprocessors", IEEE Trans. on Very Large Scale Integration Systems, vol. 8(3), pgs. 317-326 (2000).
Bellas et al., Using Dynamic Cache Management Technique to Reduce Energy in Genearl Purpose Processors, pp. 693-708, (2000).
Ben Naser et al., "A Step-by-Step Design and Analysis of Low Power Caches for Embedded Processors", Boston Area Architecture Workshop (BARC-2005), (Jan. 2005).
Ben Naser, M., "Data Memory Subsystem Resilient to Process Variations", PHO Thesis, (Jan. 2008).
Ben Naser, M., "Designing Memory Subsystems Resilient to Process Variations", IEEE Computer Society Annual Symposium on VLSI (ISVLSI 2007), Brazil, (May 2007).
Ben Naser, M., "Power and Failure Analysis of Cam Cells Due to Process Variations", Proc. of 13th IEEE International Conference on Electronics, Circuits and Systems (ICECS'06), Nice, France, (Dec. 2006).
Benini, et al., "A Recursive Algorithm for Low-Power Memory Partitioning", (ISLPED'OO), ACM pp. 78-83 (2000).
Biham et al., "Differential Cryptanalysis of DES-like Cryptosystems", J. Cryptology, vol. 4, pp. 3-72 (1991).
Brooks et al., "Wattch: A Framework for Architectural-Level Power Analysis and Optimizations", Proceedings of the 27th International Symposium on Computer Architecture (ISCA '00); ACM, pp. 83-94, (2000).
Burger et al., "The SimpleScalar Tool Set, Version 2.0", Computer Sciences Dept., Univ. of Wisconsin-Madison, Technical Report 1342, pp. 13-25 (1997).
Bursky, D., "Advanced DRAM architectures overcome data bandwidth limits", Electron. Des., vol. 45, pp. 73-88 (1997).
Burtscher et al., "Static Load Classification for Improving the value Predictability of Data-Cache Misses", ACM, pp. 222-233, (2000).
Buyuktosunoglu et al., "An Adaptive Issue Queue for Reduced Power at High Performance" Power-Aware Computer Systems, First International Workshop, PACS 2000, pp. 25-39 (2000).
Calder et al. "Next Cache Line and Set Prediction." Proceedings of the 1995 International Computer Symposium on Computer Architecture, ACM, pp. 287-296 (1995).
Calder et al., "Fast & Accurate Instruction Fetch and Branch Prediction", IEEE, pp. 2-11 (1994).
Cantin et al., "Cache Performance for Selected SPEC CPU2000 Benchmarks" Computer Architecture News, 29(4):13-18 (2001).
Chang et al., "Protecting Software Code by Guards", Proc. ACM Workshop on Security and Privacy in Digital Rights management (SPDRM), LNCS 2320, pp. 160-175 (2002).
Chase et al., "Lightweight Shares Objects in a 64-Bit Operating System", Univ. of Washington, Dept. of Computer Science & Engineering, Technical Report dated Mar. 9, 1992, Seattle, WA (Jun. 1992).
Chheda et al., "Combining compiler and runtime IPC predictions to reduce energy in next generation architectures", Proceedings of the First Conference on Computing Frontiers, pp. 240-245, Italy, (Apr. 2004).
Chheda et al., "Memory Systems: Overview and Trends", Encyclopedia of Life Support Systems, (2001).
Chiou et al., "Application-Specific Memory Management for Embedded Systems Using Software-Controlled Caches", (DAC'OO), ACM, pp. 416-419 (2000).
Cohn et al., "Optimizing Alpha Executables on Windows NT with Spike", Digital Technical Journal, vol. 9(4), pp. 3-20 (1997).
Collins, L. "Power drops focus the minds at ARM", EE Times, [online] Retrieved from the Internet:<URL: http://eetimes.eu/uk/16505609> [retrieved on Aug. 28, 2008] (2002).
Compaq Computer Corporation, "Compiler Writer's Guide for the Alpha 21264", Digital Equipment Corporation ( © 1999).
Cooper et al., "Compiler-Controlled Memory", ASPLOS VIII; ACM, 33(11):2-11 (1998).
Cortadella et al., "Evaluation of A+B=K Conditions Without Carry Propagation", IEEE Trans. on Computers, vol. 41(11), pp. 1484-1488 (Nov. 1992).

(56) References Cited

OTHER PUBLICATIONS

Cosoroba, A., "Double Data Rate Synchronous DRAMS in High Performance Applications", WESCON'97 IEEE Conference Proceedings, pp. 387-391, (1997).
Cowell et al., "Improved Modeling and Data-Migration for Dynamic Non-Uniform Cache Access", In WDD2 2003 organized in conjunction with ISCA (2003).
Daemen et al., "The Rijndael Block Cipher—AES Proposal", [online] Tech. Rep., (Mar. 9, 1999) [retrieved on Apr. 1, 2008], Retrieved from the Internet: <URL:http://csrc.nist.gov/encryption/aes/rou nd2/r2algs. htm>.
Deitrich et al., "Sepculative Hedge: Regulating Compile-Time Speculation Against Profile Variations", IEEE, pp. 70-79, (1996).
Delaluz et al., "Energy-Oriented Compiler Optimizations for Partitioned Memory Architectures", International Conference on Compilers, Architecture and Synthesis for Embedded Systems, Proceedings of the 2000 international conference on Compilers, architecture, and synthesis for embedded systems, San Jose, CA, 10 pps., (2000).
Desmet et al., "Improved Static Branch Prediction for Weak Dynamic Predictions", Retrieved from the Internet: <URL: http://escher.elis.ugent.be/publ/Edocs/DOC/P103_085.pdf>, pp. 1-3, (Sep. 2003).
Folegnani et al., "Energy-Effective Issue Logic", IEEE, 10 pgs. (2001).
Frank et al., "SUDS: Primitive Mechanisms for Memory Dependence Speculation", Technical Report. LCS-TM-591, (Oct. 1998).
Furber et al., "ARM3-32b RISC Processor with 4 KByte On-Chip Cache", VLSI'89, Elsevier, pp. 35-44 (1989).
Furber et al., "Power Saving Features in AMULET2e", In Power Driven Microarchitecture Workshop at 25th Annual International Symposium on Computer Architecture, Barcelona, Spain, 4 pgs. (Jun. 1998).
Gandolfi et al., "Electromagnetic Analysis: Concrete Results", Workshop of Cryptographic Hardware and Embedded Systems (CHES'01), LNCS 2162, pp. 251-261 (2001).
Gassend et al., "Controlled Physical Random Functions", Proc. 18th Ann. Computer Security Applications Conf. [online] Retrieved from the Internet:<URL:http://csg.csail.mit.edu/pubs/memos/Memo-457/memo-457.pdf> [retrieved on Feb. 22, 2011] (2002).
Ghiasi et al., "Using IPC Variation in Workloads with Externally Specified Rates to Reduce Power Consumption", In Workshop on Complexity Effective Design, Vancouver, Canada, pp. 1-10 (Jun. 2000).
Gilmont et al., "An Architecture of security management unit for safe hosting of multiple agents", Proc. of the Int'l Workshop on Intelligent Communicatinos and Multimedia Terminals, [online] Retrieved from the Internet:<URL:http://citeseerx.ist.psu.edu/viewdoc/download?doi=10.1.1.140.6346&rep=rep1&type=pdf> [retrieved on Feb. 22, 2011] (Nov. 1998).
Gilmont et al., "Hardware Security for Software Privacy Support", Electronics Lett., vol. 35(24 ), pp. 2096-2097 (1999).
Gowan et al., "Power Considerations in the Design of the Alpha 21264 Microprocessor", (DAC 98), ACM, pp. 726-731 (1998).
Grand, J., "Attacks on and Countermeasures for USB Hardware Token Devices", Proc. Fifth Nordic Workshop on Secure IT Systems [online] Retrived from the Internet:<URL:http://citeseerx.ist.psu.edu/viewdoc/download;jsessionid=98145A989FOA335F16702C1 EA12F0819?doi=10.1.1.16.540&rep=rep1 &type=pdf>[retrieved on Feb. 22, 2011] (2000).
Grant et al., "Annotation-Directed Run-Time Specialization in C", ACM, pp. 163-178, (1997).
Guo et al., "Compiler-Enabled Cache Management for Pointer-Intensive Programs", Boston Area Architecture Workshop (BARC-2003), (Jan. 2003).
Guo et al., "Energy Characterization of Hardware-Based Data Prefetching", Proc. of the IEEE Intl. Conference on Computer Design (ICCD'04), pp. 518-523, (Oct. 2004).
Guo et al., "Energy-Aware Data Prefetching for General-Purpose Programs", Proc. of PACS'04 Workshop on Power-Aware Computer Systems, Micro-37, to be appeared on Lecture Notes in Computer Science, (Dec. 2004).

Guo et al., "PARE: A Power-Aware Data Prefetching Engine", Proc. of International Symposium on Low Power Electronics and Design (ISLPED'05), San Diego, CA, (Aug. 2005).
Guo et al., "Runtime Biased Pointer Analysis and Its Application on Energy Efficiency", Proc. of Workshop on Power-Aware Computer Systems (PACS'03), Micro-36, Dec. 2003, San Diego, CA; also in Lecture Notes in Computer Science, vol. 3164, pp. 1-12, Springer, ISBN 3-540-24031-4, (2004 ).
Guo et al., "Synchronization Coherence: A Transparent Hardware Mechanism for Cache Coherence and Fine-Grained Synchronization", accepted by Journal of Parallel and Distributed Computing (JPDC), (2007).
Guo, Y., "Compiler-Assisted Hardware-Based Data Prefetching for Next Generation Processors", PHO Thesis, (May 2007).
Gutmann, P., "Data Remanence in Semiconductor Devices", Proc. of the 10th USENIX Security Symposium, 17 pgs. (2001).
Gutmann, P., "Secure Deletion of Data from Magnetic and Solid-State Memory", Proc. of the 6th USENIX Security Symposium, 18 pgs. (1996).
Harvard University / Michael D. Smith's Research Group on Compilation and Computer Architecture; [online] Retrieved from the Internet:<URL:http://www.eecs.harvard.edu/hube/software/software.html> [retrieved on May 4, 2004].
Heinrich, J., MIPS R10000 Microprocessor's User Manual, 2nd Ed., MIPS Technologies, Inc. (1996).
Heinrich, J., MIPS R4000 Microprocessor User's Manual, 2nd Ed., MIPS Technologies, Inc. (1994).
Hennessey et al., "Enhancing Vector Performance", Computer Architecture, a Qualitative Approach, Second Edition, Section 5, pp. B23-B29 (1996).
Henry et al., "Circuits for Wide-Window SuperScalar Processors" (ISCA'OO), ACM, pp. 236-247 (2000).
Hinton et al., "The Microarchitecture of the Pentium 4 Processor", Intel Technology Journal Q1, pp. 1-12 (2001).
Huang et al., "L1 Data Cache Decomposition for Energy Efficiency", (ISLPED'01), ACM, pp. 10-15 (2001).
Huang et al., "Speculative Disambiguation: A Compilation Technique for Dynamic Memory Disambiguation", IEEE, pp. 200-210, (1994).
IBM , "Single-Bit Processor Enable Scheme", IBM Technical Disclosure Bulletin, vol. 29, No. 11, pp. 5016-5017 (Apr. 1987).
Inoue et al., Way-Predicting Set-Associative Cache for High Performance and Low Energy Consumption, (ISLPED'99), ACM, pp. 273-275 (1999).
Intel 80386 Programmer's Reference Manual (1986).
Intel, "Intel StrongARM* SA-1110 Microprocessor", SA-1110 Brief Datasheet, pp. 1-9 (2000).
International Preliminary Examination Report in application PCT/US2003/21076, dated Sep. 10, 2004.
International Search Report for Application PCT/US03/21120, dated Jul. 30, 2004.
International Search Report in Application No. PCT/US03/20999, dated Oct. 10, 2003.
Itoh et al., "DPA Countermeasure Based on 'Masking Method'", ICICS 2001, LNCS 2288, pp. 440-456 (2002).
Jain et al., "A 1.2Ghz Alpha Microprocessor with 44.8GB/s Chip Pin Bandwidth", IEEE, pp. 240-241 (2001).
Kaxiras et al., "Cache Decay: Exploiting Generational Behavior to Reduce Cache Leakage Power", IEEE, pp. 240-251 (2001).
Kean, T., "Secure Configuration of Field-Programmable Gate Arrays", Proc. of the 11th Int'l Conf. on Field-Programmable Logic and Applications [online] Retrieved from the Internet:<URL: http://citeseerx.ist.psu.edu/viewdoc/download?doi=10.1.1.86.2017&rep=rep1 &type=pdf> [retrieved on Feb. 22, 2011] (2001).
Kelsey et al., "Side Channel Cryptanalysis of Product Ciphers", Proc. ESORICS'98, pp. 97-110 (1998).
Kever et al., "A 200MHz RISC Microprocessor with 128kB On-Chip Caches", IEEE, pp. 410, 411 and 495 (1997).
Kim et al., "Partitioned Instruction Cache Architecture for Energy Efficiency", ACM Trans. on Embedded Computing Systems, v.2(2), pp. 163-185 (May 2003).

(56) References Cited

OTHER PUBLICATIONS

Kim et al., "Predictive Precharging for Bitline Leakage Energy Reduction", 15th Annual IEEE Int'l. ASIC/SOC Conference, pp. 36-40 (2002).
Kin et al., "The Filter Cache: An Energy Efficient Memory Structure", IEEE, pp. 184-193 (1997).
Kocher et al., "Differential Power Analysis", CRYPT0'99, LNCS 1666, 10 pgs. (1999).
Kocher et al., "Timing Attacks on Implementations of Diffie-Hellmann, RSA, DSS and Other Systems", Adv. In Cryptoloqy (CRYPT0'96), 10 pgs. (1996).
Kommerling et al., "Design Principles for Tamper-Resistant Smartcard Processors", USENIX Workshop on Smartcard Technology, 12 pgs. (1999).
Kowalczyk et al., "First-Generation MAJC Dual Processor", IEEE, pp. 236-237 and 451 (2001).
Kuhn et al., "Soft Tempest: Hidden Data Transmission Using Electromagnetic Emanations", Proc. of 2nd Int'l Workshop on Information Hiding [online] Retrieved from the Internet:<URL:http://www.cl.cam.ac.uk/-mgk25/ih98-tempest.pdf> [retrieved on Feb. 22, 2011] (1998).
Kuhn et al., "Tamper Resistance—A Cautionary Note", Proc. of the 2nd USENIX Workshop on Electronics Commerce, 11 pgs. (1996).
Kuhn, M., "Optical Time-Domain Easvesdropping Risks of CRT Displays", Proc. of the 2002 IEEE Symp. on Security and Privacy [online] Retrieved from the Internet:<URL:http://www.cl.cam.ac.uk/-mgk25/ieee02-optical.pdf> [retrieved on Feb. 22, 2011] (May 2002).
Kulkarni et al., "Advanced Data Layout Optimization for Multimedia Applications", Lecture Notes in Computer Science; vol. 1800, Proceedings of the 15 IPDPS 2000 Workshops on Parallel and Distributed Processing, 8 pps. (2000).
Lam et al., "Limits of Control Flow on Parallelism", ACM, pp. 46-57 (1992).
Larsen et al., "Exploiting Superword Level Parallelism With Multimedia Instruction Sets", (PLDI'OO), ACM, pp. 145-156 (2000).
Lee et al., "MediaBench: A Tool for Evaluating and Synthesizing Multimedia and Communications Systems", International Symposium on Microarchitecture, pp. 330-335 (1997).
Lee et al., "Region-Based Caching: An Energy-Delay Efficient Memory Architecture for Embedded Processors." (CASES '00) ACM, pp. 120-127 (2000).
Leenstra et al., "A 1.8 GHz Instruction Buffer", IEEE, pp. 314-315 and 459 (2001).
Levinthal et al., "Chap—A SIMD Graphics Processor", Computer Graphics, vol. 18(3), (Jul. 1984).
Lie et al., "Architectural Support for Copy and Tamper Resistant Software", Proc. of the 6th Int'l Conf. Architectural Support for Programming Languages and Operating Systems, ACM, 10 pgs. (2000).
Loughry et al., "Information Leakage from optical Emanations", ACM Trans. on Information and System Security, vol. 5(3), 28 pgs. (2002).
MAC OS Runtime Architectures for System 7 Through MAC OS 9, Ch. 7, (Pub. Jan. 31, 1997 (c) Apple Inc.) [online] Retrieved from the Internet: <URL:http://developer.apple.com/documentation/mac/pdf/MacOS_RT _Architectures.pdf> [retrieved on Aug. 13, 2009].
Manne et al., "Pipeline Gating: Speculation Control for Energy Reduction", IEEE, pp. 132-141 (1998).
Marculescu, D., "Profile-Driven Code Execution for Low Power Dissipation", (ISPLED'OO) ACM, pp. 253-255 (2000).
Maro et al., "Dynamically Reconfiguring Processor Resources to Reduce Power Consumption in High-Performance Processors, Workshop on Power-Aware Computer Systems", (PACS '00 / LNCS 2008) ACM, pp. 97-111 (2001).
Memik et al., "A Selective Hardware/Compiler Approach for Improving Cache Locality", Center for Parallel and Distributed Computing, Northwestern University; pp. 1-21 (2000).

Menezes et al., "Handbook of Applied Cryptography", CRC Press (CRC Press Series on Discrete Mathematics and Its Applications), (1997).
Messerges et al., "Examining Smart Card Security Under the Threat of Power Analysis Attacks", IEEE Trans. on Computers, vol. 51(5), pp. 541-552 (2002).
Michaud et al. "Data-Flow Prescheduling for Large Instructions Windows in Out-of-Order Processors, 7th International", IEEE, pp. 27-36 (2001).
MICR0'34 (2001).
Milutinovic et al., "The Split Temporal/Spatial Cache: Initial Performance Analysis", Proceedings of the SCIzzL-5, 8 pps. (1996).
Mirsky et al., "MATRIX: A Reconfigurable Computing Architecture with Configurable Instruction Distribution and Deployable Resources", Proc. of the IEEE Symposium on FPGSs for Custom Computing Machines, pp. 157-166 (1996).
Montanaro et al., "A 160 MHz, 32b, 0.5-W CMOS RISC Microprocessor", IEEE, 31(11):1703-1714 (1996).
Moritz et al., "Adaptive Distributed Software Virtual Memory for Raw", Laboratory for Computer Science, Raw group, MIT, Cambridge, MA (Jan. 1999).
Moritz et al., "Exploring Cost-Performance Optimal Designs of Raw Microprocessors", The 6th Annual IEEE Symposium on Field-Programmable Custom Computing Machines FCCM'98., Napa, California, (Apr. 1998).
Moritz et al., "Fault-Tolerant Nanoscale Processors on Semiconductor Nanowire Grids", IEEE Transactions on Circuits and Systems I, special issue on Nanoelectronic Circuits and Nanoarchitectures, vol. 54, iss. 11, pp. 2422-2437, (Nov. 2007).
Moritz et al., "FlexCache: A Framework for Flexible Compiler Generated Data Caching", Proc. of the 2nd Intelligent Memory Workshop, IRAMOO, Cambridge, MA, (Nov. 2000).
Moritz et al., "Hot Pages: Design and Implementation of Software Caching for Raw", IBM Research Lab Austin, (May 1999).
Moritz et al., "Hot Pages: Software Caching for Raw Microprocessors", International Symposium for Computer Architecture (ISCA-27), Massachusetts Institute of Technology, Cambridge, MA, pp. 1-9 (1999).
Moritz et al., "Latching on the Wire and Pipelining in Nanoscale Designs", 3rd Workshop on Non-Silicon Computation (NSC-3), ISCA'04, Germany, (Jun. 2004).
Moritz et al., "LoGPC: Modeling Network Contention in Message-Passing Programs", ACM Joint International Conference on Measurement and Modeling of Computer Systems, ACM Sigmetrics/Performance 98 Wisconsin Madison, also in ACM Performance Evaluation Review Special Issue vol. 26 No. 1, (Jun. 1998).
Moritz et al., "LOGPC: Modeling Network Contention in Message-Passing Programs", IEEE Transactions on Parallel and Distributed Systems, vol. 12, No. 4, pp. 404-415, (Apr. 2001).
Moritz et al., "Security Tradeoffs in NEST", DARPA Presentation, (Dec. 2003).
Moritz et al., "SimpleFit: A Framework for Analyzing Design Tradeoffs in Raw Architectures", IEEE Transactions on Parallel and Distributed Systems, vol. 12, No. 7, pp. 730-742, (Jul. 2001).
Moritz et al., "Towards Defect-tolerant Nanoscale Architectures", Invited Paper, IEEE Nano2006, (2006).
Mueller et al., "Predicting Instruction Cache Behavior", ACM SIGPLAN Workshop on Language, Compiler * Tool Support for Real-Time Systems (Jun. 1004).
Narayanan et al., "CMOS Control Enabled Single-Type FET NASIC", Best Paper Award, IEEE Computer Society Annual Symposium on VLSI 2008, (2008).
Narayanan et al., "Comparison of Analog and Digital Nano-Systems: Issues for the Nano-Architect", IEEE International Nanoelectronics Conference (INEC), (2008).
Narayanan et al., "Image Processing Architecture for Semiconductor Nanowire based Fabrics", accepted by IEEE 8th International Conference on Nanotechnology, (2008).
National Bureau of Standards, "Data Encryption Standard", Tech. Rep. NBS FIPS Pub. 46, Nat'l Bur. Standards, US Dept. of Commerce (Jan. 1977).

(56) References Cited

OTHER PUBLICATIONS

Nicolau et al., "Measuring the Parallelism Available for Very Long Instruction Word Architectures", IEEE Transactions on Computers, 33(11):968-976 (1984).
Oppenheim, A. et al., "Discrete-Time Signal Processing", Prentice-Hall, Upper Saddle River, NJ (1999).
Ors et al., "Power-Analysis Attack on an ASIC AES Implementation", Proc. of Int'l Symp. on Information Tech. [online] Retrieved from the Internet:<URL:http://citeseerx.ist.psu.edu/viewdoc/download?doi=10.1.1.88.2697&rep=rep1&type=pdf> [retrieved on Feb. 22, 2011] (ITCC 2004 ).
Palacharla et al., "Complexity-Effective Superscalar Processors", (ISCA'97) ACM, pp. 206-218 (1997).
Panda et al., "Efficient Utilization of Scratch-Pad Memory in Embedded Processor Applications", IEEE, pp. 7-11 (1997).
Parikh et al., "Power Issues Related to Branch Prediction", (HPCA'02) IEEE, 12 pgs. (2002).
Pering et al., "Dynamic Voltage Scaling and the Design of a Low-Power Microprocessor System", In Power Driven Microarchitecture Workshop, attached to ISCA98, (Jun. 1998).
Ponomarev et al., "Reducing Power Requirements of Instruction Scheduling Through Dynamic Allocation of Multiple Datapath Resources", IEEE, pp. 90-101 (2001).
Postiff et al., "The Limits of Instruction Level Parallelism in SPEC95 Applications", Computer Architecture News, vol. 217(1). 10 pgs. (1999).
Powell et al., "Reducing Set-Associative Cache Energy via Way-Prediction and Selective Direct-Mapping", IEEE, pp. 54-65 (2001).
PowerPC Upgrade FAQ, Powerbook 500 Series PPC Upgrade from IMAX (dated Jan. 28, 1997) [online], Retrieved from the Internet: <URL:http://www.darryl.com/ppcfaq.html> [retrieved on Aug. 13, 2009].
Prasad et al., "Efficient Search Techniques in the Billion Transistor Era", Invited paper, appears in PDPTA, Las Vegas, NV, (2001).
Prosecution History for U.S. Appl. No. 10/967,989, through Mar. 8, 2011.
Prosecution History for U.S. Appl. No. 10/967,989, through May 24, 2012.
Prosecution History for U.S. Appl. No. 10/987,374, through Jul. 20, 2011.
Prosecution History for U.S. Appl. No. 10/987,374, through Mar. 8, 2011.
Prosecution History for U.S. Appl. No. 11/037,663, through Mar. 8, 2011.
Prosecution History for U.S. Appl. No. 11/804,947, through Mar. 8, 2011.
Prosecution History for U.S. Appl. No. 11/981,178, through Jun. 19, 2012.
Prosecution History for U.S. Appl. No. 13/033,159, through May 24, 2012.
Prosecution History for U.S. Appl. No. 13/187,645, through May 24, 2012.
Qi et al., "A Unified Cache Coherence and Synchronization Protocol", Boston Area Architecture Workshop (BARC-2004 ), (Jan. 2004).
Quisquater et al., "Electromagnetic Analysis (EMA) Measures and Counter-Measures for Smart Cards", E-smart 2001, LNCS 2140, pp. 200-210 (2001).
Ramirez et al., "Branch Prediction Using Profile Data", Springer-Verlag Berlin Heidelberg, pp. 386-394, (2001).
Ranganathan et al., "Reconfigurable Caches and their Application to Media Processing", (ISCA'OO) ACM, pp. 214-224 (2000).
Rao et al., "EMPowering Side-Channel Attacks", IBM Research Ctr. [online] Retrieved from the Internet:<URL:http://eprint.iacr.org/2001/037.pdf> [retrieved on Feb. 22, 2011] (May 2001).
Reinman et al., "An Integrated Cache Timing and Power Model", COMPAQ Western Research Lab, pp. 1-20 (1999).
Rugina et al., "Pointer Analysis for Multithreaded Programs", Proc. of SIGPLAN'99 Conf. on Program Language Design and Implementations (May 1999).
Sair et al., "Memory Behavior of the SPEC2000 Benchmark Suite", IBM Thomas J. Watson Research Center Technical Report RC-21852, pp. 1-8, (Oct. 2000).
Sanchez et al., Static Locality Analysis for Cache Management, pp. 261-271. (1997).
Schlansker et al., "Achieving High Levels of Instruction-Level Parallelism with Reduced Hardware Complexity", Hewlett Packard Laboratories (HP-96-120), pp. 1-85 (1994).
Schneier et al., "Applied Cryptography, 2nd Ed.", pp. 13 and 270-278, John Wiley & Sons, Inc., (pub.), (1996).
Schwartz et al., "Disassembly of Executable Code Revisited", Proc. 9th Working Conf. on Reverse Engineering (WCRE'02), 10 pgs. (2002).
Simunie et al., "Source Code Optimization and Profiling of Energy Consumption in Embedded Systems", Proc. 13th Int'l Symposium on System Synthesis, pp. 193-198, (2000).
Singh et al., "Short Range Wireless Connectivity for Next Generation Architectures", Invited paper, appears in PDPTA, Las Vegas, NV, (2001).
Skorobogatov et al., "Optical Fault Induction Attacks", Proc. of Cryptographic Hardware and Embedded Systems (CHES'02), LNCS 2523, pp. 2-12 (2003).
Skorobogatov, S., "Breaking Copy Protection in Microcontrollers", [online] Retrieved from the Internet:<URL:http://www.cl.cam.ac.uk/-sps32/mcu_lock.html> [retrieved on Feb. 22, 2011] (2000).
Skorobogatov, S., "Data Remanence in Flash Memory Devices", Proc. of Cryptog. Hardware and Embedded Systems (CHES2005) [online] Retrieved from the Internet:<URL:http://s3.amazonaws.com/ppt-download/data-remanence-in-flash-memory-devices 1949.pdf?response-content-disposition=attachment&Signature=p51Xjx2Qcu760LiE02JwBVQHYCo%3D&Expires=1298390877&AWSAccessKeyId=AKIAJLJT267DEGKZDHEQ> [retrieved on Feb. 22, 2011] (2005).
Skorobogatov, S., "Tamper Resistance and Physical Attacks", Summer School on Cryptographic Hardware, Side-Channel and Fault Attacks (ECRYPT-2006), Jun. 12-15, 2006, Louvain-la-Neuve [online] Retrieved from the Internet:<URL: http://www.cl.cam.ac.uk/-sps32/#Publications> [retrieved on Feb. 22, 2011] (2006).
Sohi et al., "Instruction Issue Logic for High-Performance, Interruptable Pipelined Processors", ACM, pp. 27-34 (1987).
Srivastava et al., "Atom: A System for Building Customized Program Analysis Tools", Proc. of ACM SIGPLAN'94 Conf. on Programming Languages Design and Implementation, pp. 196-205 (1994).
Stanford University SUIF Compiler Group [online] Retrieved from the Internet:<URL: http://suif.stanford.edu/> [retrieved on May 4, 2004].
Steensgard, B., "Points-to Analysis in Almost Linear Time", POPL96 (1996).
Steinke et al., "Reducing Energy Consumption by Dynamic Copying of Instructions onto Onchip Memory", Proc. of the 15th Int'l Symposium on System Synthesis, pp. 213-218 (2002).
Telikepalli, A., "Is Your FPGA Design Secure?", XCELL Journal, [online] Retrieved from the Internet:<URL:http://cdserv1.wbut.ac.in/81-312-0257-7/Xilinx/files/Xcell%20Journal%20Articles/xcell_47/xc_secure4 7.pdf> [retrieved on Feb. 22, 2011] (2003).
The Standard Performance Evaluation Corporation, http://www.spec.org, ( © 2002).
Trichina et al., "Secure AES Hardware Module for Resource Constrained Devices", ESAS 2004, Lee. Notes in CompSci 3313, [online] Retrieved from the Internet:<URL:http://citeseerx.ist.psu.edu/viewdoc/download?doi=10.1.1.95.6712&rep=rep1&type=pdf> [retrieved on Feb. 22, 2011] (2005).
Tune et al., "Dynamic Predictions of Critical Path Instructions", IEEE, pp. 185-195 (2001).
Tygar et al., "Dyad: A System for Using Physically Secure Coprocessors", Tech. Rep. CMU-CS-91-140R, Carnegie Mellon University, 38 pgs. (1991).
U.S. Appl. No. 60/515,260, filed Oct. 29, 2003.
U.S. Appl. No. 60/856,593, filed Nov. 3, 2006.
U.S. Appl. No. 60/520,838, filed Nov. 17, 2003.
U.S. Appl. No. 60/541,875, filed Feb. 4, 2004.
U.S. Appl. No. 60/802,451, filed May 22, 2006.

(56) References Cited

OTHER PUBLICATIONS

Unnikrishnan et al., "Dynamic Compilation for Energy Adaption", IEEE / ACM Int'l. Conf. on Computer-Aided Design (2002).
Unsal et al., "An Analysis of Scalar Memory Accesses in Embedded and Multimedia Systems," High Performance Memory Systems, Springer-Verlag, (2003).
Unsal et al., "Cool-Cache for Hot Multimedia", in Proc. of the 34th Annual International Symposium on Microarchitecture (MICRO-34), Austin, TX, pp. 274-283, (Dec. 2001).
Unsal et al., "Cool-Cache: A compiler-enabled energy efficient data caching framework for embedded/multimedia processors", ACM Transactions on Embedded Computing Systems (TECS), vol. 2(3):373-392, (Aug. 2003).
Unsal et al., "Cool-Fetch: A Compiler-Enabled IPC Estimation Based Framework for Energy Reduction", Proc. of the 8th Annual Workshop on Interaction between Compilers and Computer Architecture (INTERACT-8), pp. 43-52, (Feb. 2004).
Unsal et al., "Cool-Fetch: Compiler-Enabled Power-Aware Fetch Throttling," IEEE Computer Architecture Letters, vol. 1, (2002).
Unsal et al., "On Memory Behavior of Scalars in Embedded Multimedia Systems", Workshop on Memory Performance Issues, ISCA, Goteborg, Sweden, (Jun. 2001 ).
Unsal et al., "The Minimax Cache: An Energy Efficient Framework for Media Processors," IEEE, pp. 131-140 (2002).
Unsal et al., High-Level Power-Reduction Heuristics for Embedded Real-Time Systems, University of Massachusetts, pp. 1-6, (2000).
Unsal et al., Power-Aware Replication of Data Structures in Distributed Embedded Real- Time Systems, IPDPS 2000 Workshops, pp. 839-846, (2000).
van Eck, W., "Electronic Radiation from Video Display Units: An Eavesdropping risk?", Computers & Security [online] Retrieved from the Internet:<URL:http://jya.com/emr.pdf>, [retrieved on Feb. 22, 2011] (1985).
Vinciguerra et al., "An Experimentation Frameowrk for Evaluating Disassembly and Decompilation Tools for C++ and Java", IEEE Proc. of the 10th Working Conf. on Reverse Engineering (WCRE'03), 10 pgs. (2003).
Voronin, A. "Data Storage on Hard Disks" [online] Retrieved from the Internet:>URL:http://www.digit-life.com/articles/bootman/index.html> [retrieved on Aug. 27, 2008].
Wall, David W., "Limits of Instruction-Level Parallelism", ACM, pp. 176-188 (1991).
Wang et al., "Combining 2-level Logic Families in Grid-based Nanoscale Fabrics", accepted by IEEE/ACM Symposium on Nanoscale Architectures(NanoArch'07), (Oct. 2007).
Wang et al., "Combining Circuit Level and System Level Techniques for Defect-Tolerant Nanoscale Architectures", 2nd IEEE International Workshop on Defect and Fault Tolerant Nanoscale Architectures (NanoArch 2006), Boston, MA, (Jun. 2006).
Wang et al., "Compiler-Based Adaptive Fetch Throttling for Energy Efficiency", Proc. of the 2006 IEEE International Symposium on Performance Analysis of Systems and Software(ISPASS'06), Austin, TX, (Mar. 2006).
Wang et al., "NASICs: A Nanoscale Fabric for Nanoscale Microprocessors", IEEE International Nanoelectronics Conference (INEC), (2008).
Wang et al., "Opportunities and Challenges in Application-Tuned Circuits and Architectures Based on Nanodevices", Proceedings of the First Conference on Computing Frontiers, pp. 503-511, Italy, (Apr. 2004).
Wang et al., "Self-Healing Wire-Streaming Processors on 2-D Semiconductor Nanowire Fabrics", NSTI (Nano Science and Technology Institute) Nanotech 2006, Boston, MA, (May 2006).
Wang et al., "Wire-Streaming Processors on 2-D Nanowire Fabrics", NSTI (Nano Science and Technology Institute) Nanotech 2005, California, (May 2005).
Wang, T., "Exploring Nanoscale Application-Specific ICs and Architectures", Boston Area Architecture Workshop (BARC-2004 ), (Jan. 2004).
Weber "Hammer: The Architecture AMD's of Next-Generation Processors", Microprocessor Forum, (2001).
Weingart et al., "Physical Security Devices for Computer Subsystems: A Survey of Attacks and Defenses", Workshop on Cryptographic Hardware and Embedded Systems (CHES2000), LNCS 1965, pp. 302-317 (2000).
White, R., "How Computers Work", Millenium Edition, Que Corporation, p. 36 (1999).
Wikipedia entry for "context switch", (Pub. Oct. 26, 2001) [online] Retrieved from the Internet: <URL:http://en.wikipedia.org/w/index.php?title=Context_switch&oldid=244184> [retrieved on Aug. 13, 2009].
Wilson et al., "Efficient Context-Sensitive Pointer Analysis for C Programs", Proc. ACM SIGPLAN'95 Conf. on Pgrogramming Language Design and Implementation, (Jun. 1995).
Wilton et al., "CACTI: An Enhanced Cache Access and Cycle Time Model", IEEE—Journal of Solid-State Circuits, 31(5):677-688 ( 1996).
Witchel, E., "Direct Addressed Caches for Reduced Power Consumption", IEEE, pp. 124-133 (2001).
Wollinger et al., "How Secure are FPGAs in Cryptographic Applications", Proc. of the 13th Int'l Conf. on Field-Programmable Logic and Applications (FPL-2003), 11 pgs. (2003).
Wollinger et al., "Security on FPGAs: State of the Art Implementations and Attacks", ACM Transactions on Embedded Computing Systems (TECS) TECS Homepage archive, vol. 3 Issue 3, [online] Retrieved from the Internet:<URL:http://www.wollinger.org/papers/Wollingeretal_ACMTransEmbeddedSysFPGACryptoOverview.pdf> [retrieved on Feb. 22, 2011] (Aug. 2004).
Yang et al., "An Integrated Circuit/Architecture Approach to Reducing Leakage in Deep-Submicron High-Performance I-Caches", IEEE, pp. 147-157 (2001).
Young et al., "Improving the Accuracy of Static Branch Prediction Using Branch Correlation", ACM, pp. 232-241, (1994).
Zhang et al., "Compiler Support for Reducing Leakage Energy Consumption", Proc. of the Design, Automation and Test in Europ Conference and Exhibition [Date'03] (Mar. 2003).
Zhang et al., "Highly-Associative Caches for Low-Power Processors", Kool Chips Workshop, 33rd International Symposium on Microarchitecture, 6 pgs. (2000).
Zyuban et al., "Inherently Lower-Power High-Super-Performance Superscalar Architectures", IEEE Transactions on Computers, 50(3):268-285 (2001).

\* cited by examiner

SECURING MICROPROCESSORS AGAINST INFORMATION LEAKAGE AND PHYSICAL TAMPERING

CROSS-REFERENCE TO RELATED APPLICATIONS

This application is a continuation of U.S. patent application Ser. No. 14/750,194, which was filed on Jun. 25, 2015 and which is currently allowed and pending; U.S. patent application Ser. No. 14/750,194 being a continuation of U.S. patent application Ser. No. 13/685,953, which was filed on Nov. 27, 2012 and which issued as U.S. Pat. No. 9,069,938 on Jun. 30, 2015; U.S. patent application Ser. No. 13/685,953 being a continuation of U.S. patent application Ser. No. 11/981,178, which was filed on Oct. 31, 2007 and which is now abandoned; U.S. patent application Ser. No. 11/981,178 claiming the benefit of priority to U.S. Provisional Application No. 60/856,593, which was filed on Nov. 3, 2006. U.S. applications Ser. Nos. 14/750,194, 13/685,953, 11/981,178, and 60/856,593 are hereby incorporated by reference into this application as if set forth herein in full.

TECHNICAL FIELD

This invention relates generally to providing effective defense against information leakage and tampering in a microprocessor or a system where such a secured microprocessor would be incorporated. More particularly, it relates to a processor framework and methods supporting an execution based on chained sequences of small obfuscated codes called safe zones and associated randomized execution. It relates to mechanisms to make encoding of instructions in each safe zone random and unique for each chip, or compilation, and to ensure that breaking into a safe zone's encoding does not compromise another safe zone's security or does not allow leaking information from the processor outside that safe zone. The invention provides effective mechanisms across compiler, instruction set architecture, and micro-architecture layers to defend against offline and runtime security attacks including software and hardware reverse engineering, invasive microprobing, fault injection, and high-order differential and electromagnetic power analysis. The invention provides the security benefits without significantly impacting performance, power consumption, or energy efficiency during execution.

Furthermore, systems that incorporate a microprocessor with above technology can rely on the trust and security provided inside the processor to defend against different kinds of information leakage and tampering attacks including both invasive and non-invasive methods. Additionally, systems that in addition incorporate microprocessors with lesser security that would run applications, could be still effectively defended with the addition of a security microprocessor designed with the proposed invention.

BACKGROUND

Processing devices are vulnerable to security attacks including software attacks, invasive attacks by removing layers of packaging and different types of non-invasive attacks like fault injection and power analysis, etc. Attacks are also often categorized as in-wire when an attack does not require physical presence of an attacker. An example of such an attack is through the internet or other connection to another system. Non in-wire attackers would need typically to have access to the system.

This section mainly focuses on attacks that require considerable resources or Class III such as funded organizations with unlimited resources. Other lesser sophisticated attacks are similarly defended. A list of some of the available defense mechanisms is also described after the attack scenarios.

Attack categories: There are several sophisticated attack strategies reported. First, there are non-invasive side-channel attacks based on differential power analysis, electromagnetic analysis, and fault injection. Attacks based on power and electromagnetic analysis utilize the fact that encryption devices leak key data electromagnetically, whether by variation in power consumption or electromagnetic radiation. Differential power analysis (DPA) is very effective against cryptographic designs and password verification techniques. Electromagnetic analysis allows more focused observation of specific parts of a chip. Fault injection attacks typically require precise knowledge of the time instances when faults are injected and aim, e.g., at modifying memory bits to allow extraction of side-channel information. There are several reported successful side-channel attacks, e.g., recovery of password in Freescale MC908AZ60A, AES ASIC implementations, and smart cards.

Another attack category is based on invasive methods. Chips can be decapsulated front-side and/or rear-side manually using nitric acid and Acetone, or automatically using concentrated HNO3 and H2SO4. The more advanced approaches for reverse engineering have the capability to gather information about deep-submicron designs using Optical Imaging (OI), or Scanning Electron Microscopy (SEM). SEM yields higher-precision reverse engineering, often with sufficient detail for building gate-level models enabling VHDL simulation. SEM-based Voltage Contrast Microscopy is used to read memory cells.

Some attacks are based on recovering data from erased locations (e.g., caused by tamper-detection related zeroization logic) in SRAM and non-volatile memory due to data remanence—see successful attack on PIC16F84A. Other attacks are semi-invasive, e.g., UV or X-rays based, and can be completed without requiring removal of passivation layers.

Microprobing attacks would rely on removing the polymer layer from a chip surface, local removing of passivation layers, cutting through metal layers and using Focus Ion Beam (FIB) probes. FIB allows 10-nm precision to create probing points and/or restore security fuses. There are several companies specializing in chip reverse engineering, e.g., Chipworks and Semiconductor Insights at the time of submission of this patent.

Because microprocessors are vulnerable they cannot provide defense against sophisticated attackers. When added to systems such as an embedded device, mobile phone, or personal computer, the whole system's security is affected by the lack of a trusted component. In such systems an attacker has several ways to attack including by modifying and tampering with the software, attacking in memory, attacking the operating system, or physically attacking the processor itself. Existing solutions are not adequate whenever high security is necessary. This includes application such as premium content security, access to enterprise resources, devices used in power plats, defense systems, government systems etc.

Defenses: State-of-the-art approaches offer limited defense against Class III attacks. Partial defense is provided by techniques including tamper detection with top metal layer sensors, operating voltage as well as temperature sensors, highly doped silicon substrate to defend against a rear-side attack, sophisticated security fuses including those in memory arrays, zeroization logic of security-sensitive state in case of tamper-detection, encryption of memory content with cryptographic accelerators, encryption of buses (typically with simple techniques to not affect latency), VTROM used instead of Mask ROM and Flash memory for non-volatile memory (not visible with static reverse engineering), and various defenses against memory remanence. There has been significant work on securing cryptographic implementations and software protection. These techniques are often software based an vulnerable to even simple attacks based on reverse engineering and running through debuggers. When they are microprocessor-assisted, they are vulnerable as microprocessors today to dot protect against sophisticated attackers.

Examples of micro-architectural techniques include memory architectures with protection like ARM Trust-Zone, randomized clock or various asynchronous designs, circuits based on process variation, etc.

The ever increasing sophistication of attacks implies that there is a considerable need to enhanced security during processing. Clearly, with a global trade of products and services it will be difficult to address security without establishing trust at the processing layer. No more can one rely on that just because a processing unit is completing a function in hardware it will be able to withstand attacks targeting extracting secret information, getting access to intellectual property, and gaining unauthorized access to system resources.

SUMMARY

The present invention addresses the foregoing need by providing methods and a processing framework creating an effective defense against the aforementioned security attacks at the digital level. As opposed to many defenses, the approach provides comprehensive security with very low cost and minimal power and performance overhead.

At the heart of the invention is a novel processor technology for obfuscated and randomized execution that is based on a security-focused compilation and code generation, associated instruction set architecture paradigm, and security-focused microarchitecture approach for allowing randomized and protected execution internally in the processor.

An aspect is the compiler-driven approach for instruction obfuscation and randomization, where the instruction encodings are randomized and tied together. The microarchitecture component of the invention supports this scrambled instruction execution wherein instructions that execute have their meaning decoded at runtime but remain in obfuscated format even internally in a processor. Another aspect is that this processor has its switching activity de-correlated from the operations it executes as the execution is itself random due to the mechanisms and random encoding.

Execution in conventional processors is based on a fixed encoding of all instructions. This allows for easy reverse engineering and makes them also vulnerable to a variety of side-channel attacks at runtime. By contrast, the invention proposed here is based on the fact that, with suitable support, the encoding of instructions can be changed at fine granularity and even randomized in chip-unique ways and execution kept obfuscated deep into the processor pipeline.

This has significant security benefits such as protecting against side-channel attacks like power and electromagnetic analysis, fault injection that would require precise knowledge of the time instances when faults are injected and data remanence attacks in RAM and non-volatile memory. Reverse engineering of the processor in this invention is not sufficient to reveal critical information due to the layered compiler-hardware approach and chip-unique obfuscated execution technology.

Furthermore, the approach hardens against micro-probing attacks by establishing fine-grained secure instruction zones, as small as basic blocks: information extracted from a secure zone is not sufficient to compromise another zone. Instructions in each secure zone are uniquely and randomly encoded. Furthermore, execution can be rendered such that the lifetime of information used to decode an instruction in a secure zone is minimized to the very short durations necessary for the instruction's execution. As soon as decoding of an instruction is completed, the information required for decoding can be discarded.

The randomization of encoding and execution can be finalized at runtime to achieve a chip unique random execution. Attacking one chip would not help in extracting information that can be used in another chip.

These features provide considerable benefits in defending against sophisticated security attacks.

Unless otherwise defined, all technical and scientific terms used herein have the same meaning as commonly understood by one of ordinary skill in the art to which this invention belongs. Although methods and materials similar or equivalent to those described herein can be used in practice or in the testing of the present invention, suitable methods and materials are described below. In addition, the materials, methods, and examples are illustrative only and are not intended to be limiting.

Other features and advantages of the invention will become apparent from the following description, including the claims and drawings.

DRAWINGS

Figure 6:
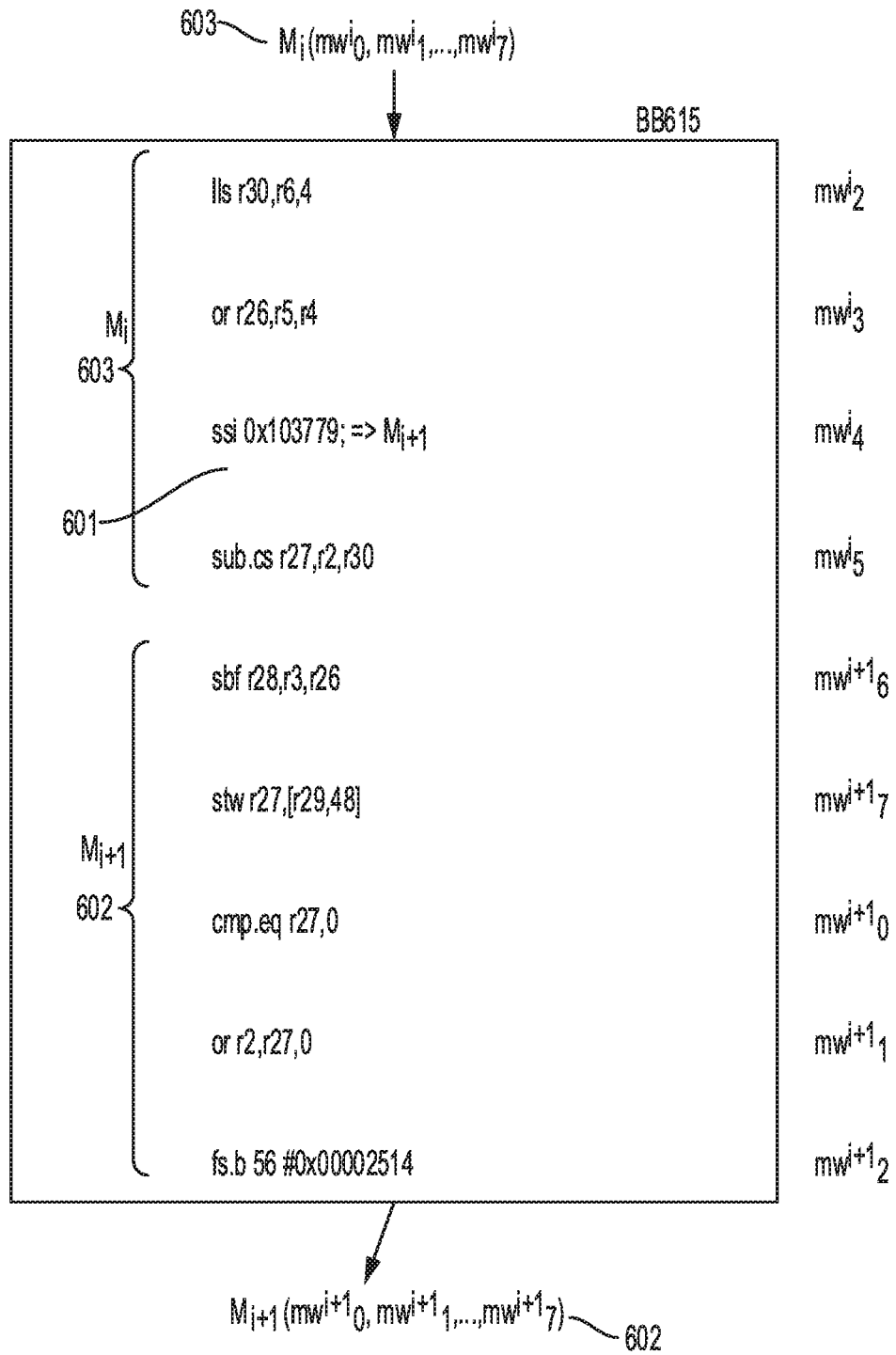

FIG. 6 shows an example of applying mutation instruction in a basic block of a computer program consisting of instructions and how mutation is applied to each instruction. The figure shows how the information coming in can be used to decode the instruction at runtime. The information encoding allows using randomly selected encodings. In other embodiments, the approach can be used to convert from one fixed ISA to another ISA targeting a flexible hardware implementation as opposed to security.

DESCRIPTION

Embodiment 1: Security Microprocessor with Randomized Encoding and Execution

Figure 1:
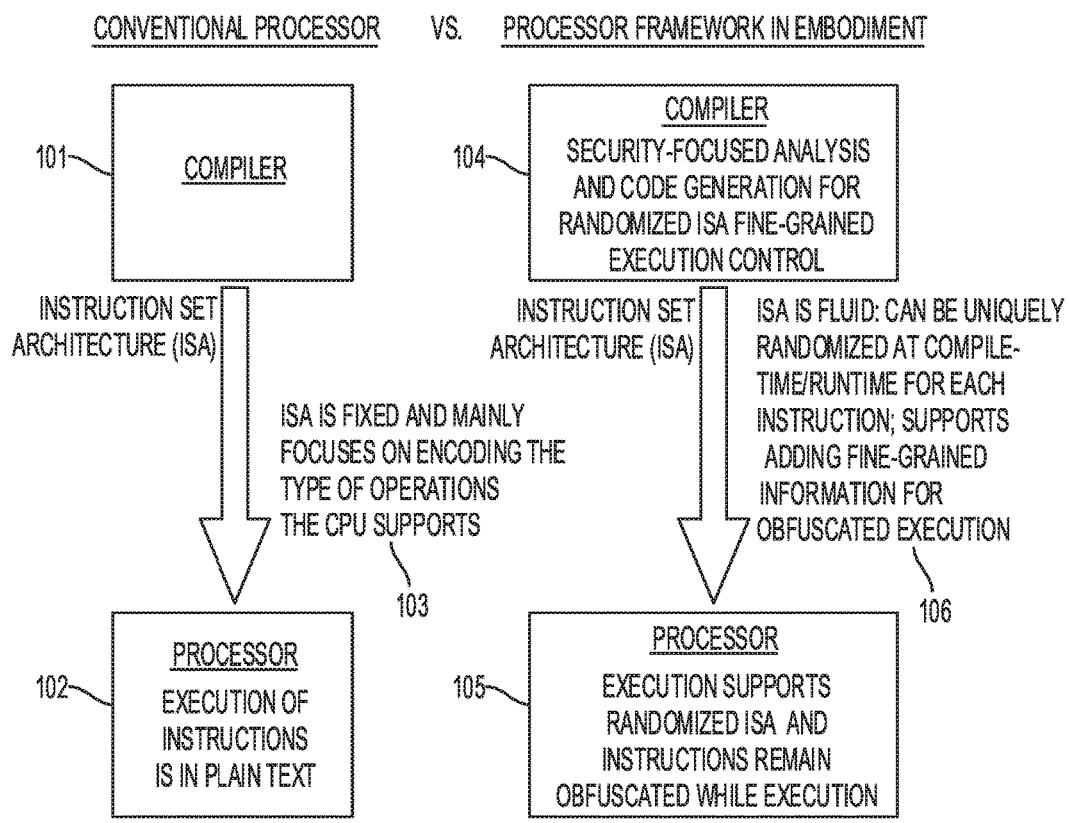
FIG. 1 is a block diagram comparing a conventional processor framework (left) with a processor framework relying on invention (right). An embodiment of such a processing device is described in embodiment 1.

A security processor in this embodiment is based on a suite of innovative technologies across compiler, instruction set architecture, and micro-architecture layers (see FIG. 1 for a comparison with a conventional processor). A key aspect is the compiler-driven approach 104 for instruction obfuscation, where instruction encodings 106 are randomized. The micro-architecture supports this scrambled instruction execution 105.

Execution in conventional processors is based on a fixed encoding of all instructions 103 and a compiler 101 that focuses on generating the sequences of instructions for a computer program. This allows for easy reverse engineering, easily identifiable internal points for microprobing, and a variety of side-channel attacks at runtime like Differential Power Analysis (DPA) in the processor 102. DPA is based on correlating the instructions with operations completed using power measurements and statistical analysis. By contrast, the processor embodiment described here is based on the fact that, with suitable support, the encoding of instructions can be changed at fine granularity and even randomized, and instructions can be executed in this format.

The basic idea of the encoding approach is to add security control instructions during compile-time code-generation; these control instructions embed guidance or hints related to how subsequent instructions should be decoded at runtime. The actual encoding of instructions can then be generated randomly: the instructions during execution would be still decodable with the help of the embedded hints in the control instructions. Of course the requirement is that the associated hints are available at runtime at the time a particular instruction is decoded. Each instruction in an executable can be encoded with an encoding scheme described or mutated by such a security control instruction. This is achieved by a security-focused code generation that can be completed at compile time or runtime.

The encoding of the control instructions themselves is similarly randomly generated and their decoding is completed with the help of other earlier control instructions. The embedded compile-time structures and built-in code-generation also support a final step of code-generationat runtime. A chip-unique encoding scheme can be created during the first power-on of the chip by randomly modifying the payload of the security/mutation instructions and rewriting the code based on the new mutations. This runtime step is enabled by symbolic information inserted into the binary by the compiler. The root of a runtime chip-unique modification can be based on a scheme leveraging a non-deterministic Random Number Generator and on-chip persistent memory cells. Other schemes can be based on codes derived with a die-specific deterministic circuit or the RTL state created by a randomly generated initialization sequence of instructions stored in persistent memory. This initialization sequence can be created at runtime inside a chip to make the sequence unique across chips.

Another aspect is that the code-generation in this embodiment introduces ambiguous control-flow between blocks fundamentally breaking up the code into secure zones: as each zone is uniquely obfuscated, compromising one zone would not make breaking into another zone simple.

Figure 5:
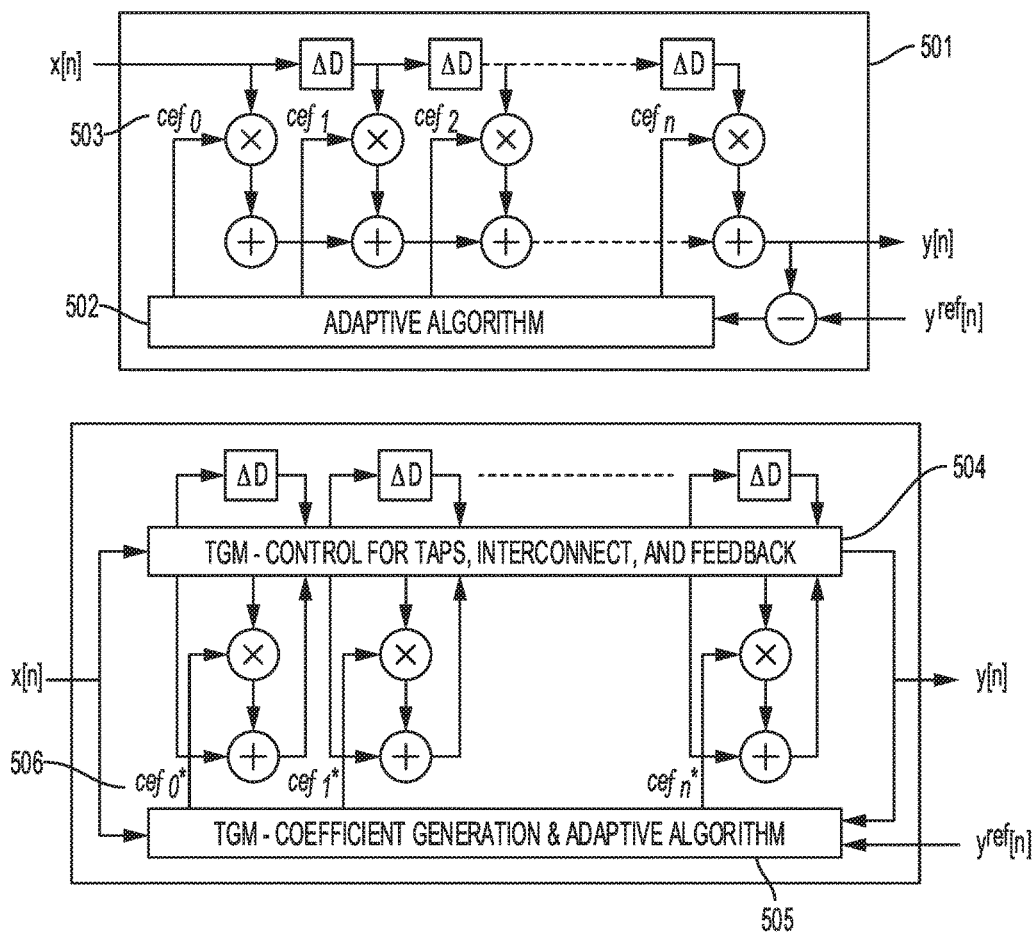
FIG. 5 shows how a block diagram of how a digital filter can be protected with security approach (detailed in embodiment 3).

Security Mutation Instructions and Secure Zones:

Before discussing the different types of mutations, FIG. 5 shows an example of using security mutations. In the figure, shown for a basic block 615, there is an incoming instruction encoding template called $M_i$. This template is randomly generated and possibly mutated randomly prior to this basic block. All instructions following in the BB615 are using the template when they are decoded unless the template is changed in the block.

The $M_i$ shown in the figure can be changed with inserted security mutation instructions ssi referred to with 501. The region following the ssi instruction changes the encoding to $M_{i+1}$ referred to as area 504.

This way, instructions can be having an encoding that is randomly created and encoding is continuously mutated whenever ssi instructions are encountered. The code is generated and organized in such a way that decoding is made possible during execution. The mutation instructions, like ssi, are also randomly encoded. For example, ssi in the example is encoded with template $M_i$.

As shown, in addition to mutation instructions, other mutations based on the instruction address can be used and combined with mutations with instructions or otherwise. This allows a modification of an encoding on potentially every instruction.

Figure 3:
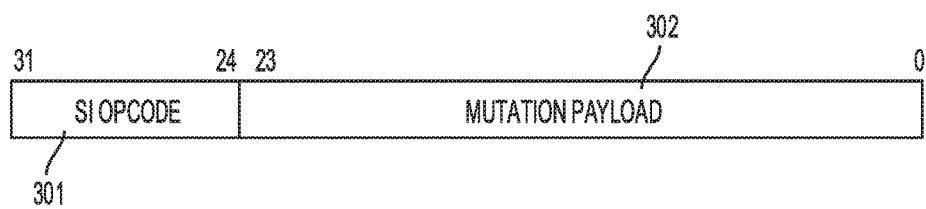
FIG. 3 shows an example security mutation instruction encoding in the ISA.

There are three types of instruction mutations that occur in this embodiment. Implicit mutations are hardware-generated mutations that are expected but not explicit in the software. Example of usage includes the initialization phase of these processing cores. A second type of ISA mutation is through static security/mutation instructions based on immediates. This type is shown in FIG. 3: opcode is 301 defines how the payload should be interpreted and payload 302 defines the mutation payload.

A third type of mutation instruction has a register-defined payload. These instructions can be used and inserted in a number of places in safe zones. When inserted at the top of the zone they modify the encoding of the following instructions of the zone but their encoding is happening with an incoming mutation defined in another safe zone. Mutations can also be added elsewhere as the only condition is that they must be available at the time a particular safe zone (they enable decode) is decoded at runtime.

There are two typical usage scenarios for the register-defined mutations: 1) a constant payload is moved to the register in a previous secure zone; or 2) the payload is made dependent on a memory-mapped location that could be either internally-generated or external to the processing core in the embodiment (memory-mapped IO).

These mutations allow implementing schemes where a mutation is tied to a different secure zone than where the mutation instruction resides or depends on outside events.

In addition to mutation instructions, the processing core in the embodiment also uses an address-based obfuscation scheme with rotating keys: this, in combination with the mutation instructions, creates a unique encoding for almost every instruction in a binary.

The mutation payload in an explicit mutation instruction is randomly generated at compile-time and/or runtime; instructions in the affected zone are transformed accordingly during compile-time and/or runtime.

A mutation instruction encodes a bit permutation such as an XOR operation and rotation of bits as defined by its payload. Because the bit permutations are simple operations, the decoding of instructions is done on-the-fly in the processor pipeline.

Each secure zone is based on a random ISA encoding and ends with an ambiguous branch. There is no correlation between the encodings used. Secure zones are linked together in a random order at compile-time, creating a fully random layout. A binary in the embodiment is protected against differential binary analysis as every compilation would result in a different set of random mutations and layout.

Figure 2:
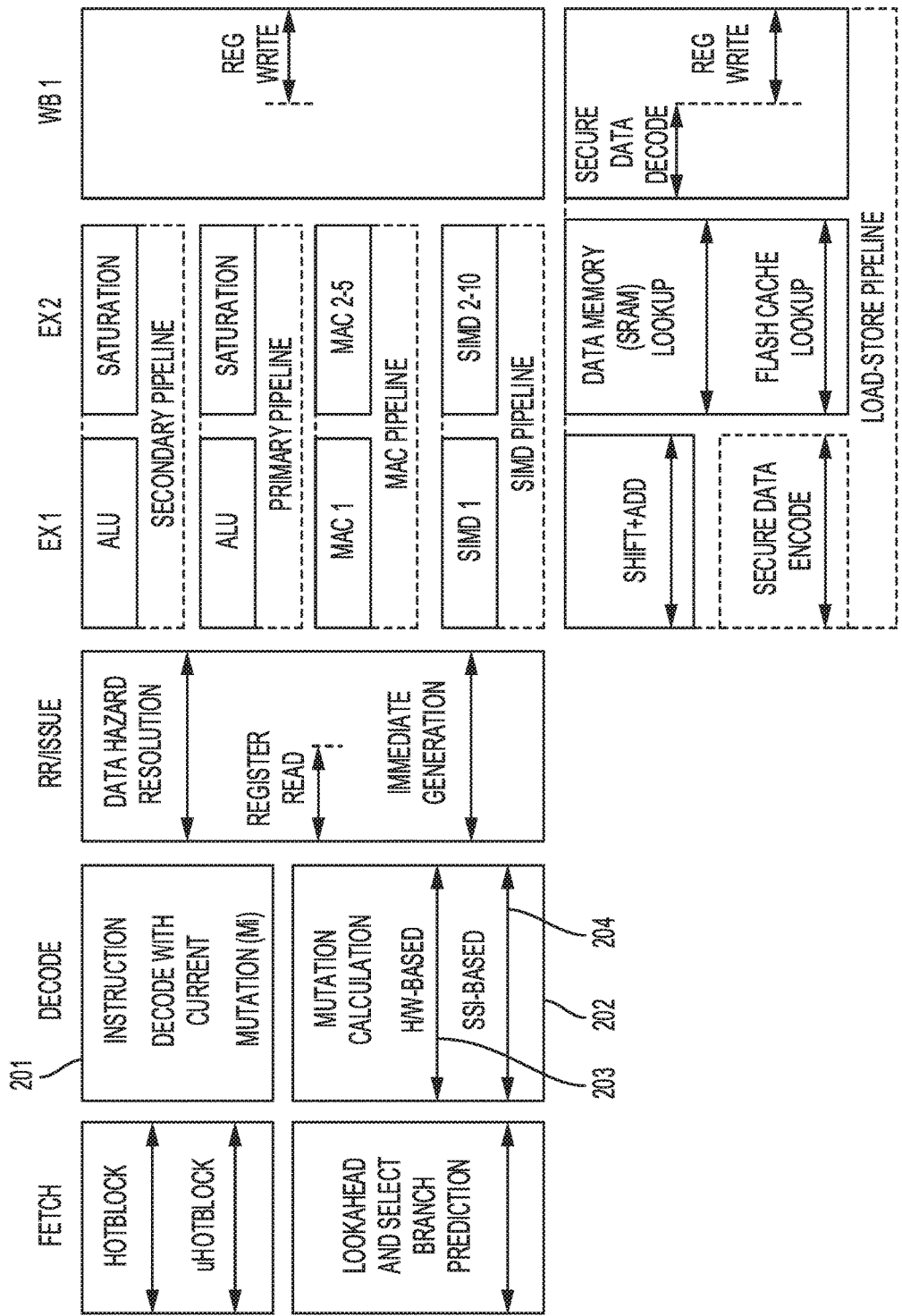
FIG. 2 shows an example microprocessor pipeline diagram implementing embodiment 1.

Pipeline Design: A pipeline design is shown in FIG. 2. The different types of mutations on instruction encodings are resolved in the decode stage 201 in hardware blocks 203 and 204. 203 represents decoding due h/w based implicit mutations such as discussed above. The block 204 represents mutations due to the ssi security mutation instructions. Any given time there is a mutation Mi available to be used. This Mi can be changed in different ways as mentioned earlier as instructions are decoded and executed. The actual mutation operations are fine grained and therefore can be kept simple so the impact on the decode stage to set up control signals is minimized. This pipeline implementation is not intended to be limiting. Other pipeline implementations are possible including compiler-driven approaches as well as single and multiple issue designs based on speculative implementations with Reservation Stations, Reorder Buffer, Result Shift Registers, virtual registers, etc.

First Power On: During the first power-on, additional randomization of a software binary executing on the processor in the embodiment can be supported, making each binary chip-unique without requiring a separate compilation for each chip. During the first startup some or all of the mutation payloads and the rotating keys can be replaced with (runtime) chip-unique random numbers that are persistent across power-on cycles; instructions in the affected secure zones are rewritten at the same time. The compiler embeds enough symbolic information to make this step computationally efficient and straightforward at runtime. A chip-unique encoding is enabled with the help of die-specific circuitry such as based on process-variation. Another approach is based on encoding the die-specific access latency (similarly due to process-related variation) in SRAM arrays. Another alternative is to have a few persistent memory cells on the die, written once by the processing core's non-deterministic random number generator. At the end of the initial boot even the startup code can be modified such that its decoding is based on a chip-unique implicit mutation.

Protection Provided by the Processing Cores in the Embodiment

At the heart of the embodiment is a unique randomized encoding and execution approach: 1) these processing cores execute instructions whose encodings can be randomly generated; 2) instructions' encodings can be further randomized at runtime in a chip-unique manner; 3) associated code-generation creates secure zones—compromising one zone would not make breaking into another zone easy; 4) this processing core's execution and switching activity cannot be correlated with the operations it executes because its execution remains obfuscated deep into its pipeline; 5) several techniques across compiler-architecture layers are used to additionally mask the power profile of operations during execution in addition to the inherent masking due to obfuscated execution.

The randomization affects all state in the processor including buses, caches, branch address tables and branch target address caches (BTAC) and register files. In the case of BTACs its content is randomly kept with the same encoding as the branch instruction's encoding. That means that when the branch instruction is decoded, even BTAC information becomes accessible for the specific branch. Other branch targets in the BTAC would, however, be protected as they are encoded with another branch's encoding that is independent from the current encoding. In the case the register file what registers are used is randomly set up at the initialization time. Content can be similarly mutated. Instruction memory is automatically protected due to the obfuscated encoding. Additional techniques can be used to protect data memory. The compiler maps each temporary memory access statically to a consumer-producer group called a location set; these are extracted by the compiler and/or rely on additional user information. As both memory reads and writes belonging to a location set would use the same obfuscation, correctness of execution is maintained. At runtime, random keys are read in and masking happens in the software uniquely for each location set. The masking varies after each power on or reset. All persistent memory (on-chip as well as off-chip) can be encrypted with a DPA-resilient AES leveraging similarly the obfuscated execution. A protection example of an AES module is presented in a subsequent embodiment.

Protection Against Black-Box Reverse Engineering Attacks: A brute-force attack against the instruction obfuscation in this embodiment would consist of quickly running through all possible scrambling permutations and filtering out those which are obviously wrong. To give an approximate idea of breaking this encoding one would need to try $2^{32}$ permutations (for a 32-bit ISA) for each instruction and try to combine variable length sequences of such instructions into valid instruction sequences. The processor ISA opcodes are mapped uniformly across operations making all bit permutations valid. Furthermore, it would be impossible to distinguish real security instructions from permutations of other ordinary instructions. It is easy to show that brute-force attacks against this scheme would be therefore too complex (from the point of view of computational and storage complexity) to be practical. The reason is that all possible bit patterns in the instruction set are legal and all possibilities would have to be considered. Note that the solution does not in fact require that all bit permutations are valid and another embodiment might choose to reserve instruction space for future extensions. The reason is that if an extremely high fraction of the possible bit patterns in the instruction set is legal, simply filtering out permutations that are syntactically incorrect would not greatly reduce the number of possibilities that would have to be considered. Moreover, in practice the length of a safe zone is not known so different lengths would need to be tried.

Protection against Side-Channel Attacks: DPA is based on statistically correlating differences in power profile across instruction sequences at key points. This embodiment, works by breaking up the correlation necessary for successful DPA attacks. By decoupling encoding from execution and combining it with other compiler-driven architecture techniques to randomize the power profile of operations—note that the control instructions are hidden by the obfuscated instruction encoding—the processing core can be protected against side-channel attacks like DPA.

Because the processing core's execution in the embodiment is kept obfuscated, the actual switching activity on internal buses, logic and memory structures cannot be correlated with the instructions. Moreover, the same type of instruction has many different encodings during execution so probing the system with different instructions would not work. The only activity that could provide a power signature of the operation is the switching activity in the Arithmetic Logic Unit (ALU) stage. The embodiment has special techniques and ISA to defend against power-analysis based on ALU power traces. These techniques can be turned on in sections of code that are security-sensitive against DPA during the security focused compilation.

Examples of techniques in the embodiment for ALU masking are operation masking and phase masking.

1) Operation Masking—It is known that the power consumption varies with each arithmetic and logic operation (for example, an AND will not consume the same power as an ADD operation). A variety of techniques are used to normalize/randomize the power profile, including: Randomly switching ON various arithmetic and logic units even when they are not used by the instruction being executed—the added additional power consumption helps mask the actual operations; Randomly switching input operands to arithmetic and logic units being used by the instruction being executed changes the power consumed by the operation by activating different transistor paths in the circuit. By doing this one can mask the actual input data values to each arithmetic and logic unit. Both this and the previous technique are fairly easy to support and do not affect performance;

Some operations, like multiplication, consume significantly more power than other operations, and it is important to mask these operations since attackers can use the power peaks created by these operations as a pivot to find patterns in the execution flow. Letting these units consume power throughout the execution in order to mask actual usage might not always be a good solution since the overall power consumption will increase significantly. The processing core in this embodiment employs a solution to mask the power consumption of these operations by randomly replacing these operations, at runtime, with SWIs (Software Interrupts).

These SWIs invoke performance-optimized code to perform requested operation in an alternate way.

Another technique is based on multiple path executions—these are equivalent implementations with different power profiles that are randomly selected during runtime.

Phase Masking is based on randomly inserting pipeline stalls during execution of security-sensitive codes the boundaries of these phases can be further masked.

Another side-channel attack described in the literature is based on injecting faults. Fault-injection attacks would be practically impossible as the encoding and execution of instructions is kept confidential: an attacker cannot find meaningful attack points to inject faults.

Protection against Advanced Micro-probing: A processing core in this embodiment has an effective protection against sophisticated micro-probing attacks such as those based on Focus Ion Beam (FIB). In this attack scenario, we assume that the attacker has the ability to understand the design after reverse engineering some of its circuits with Scanning Electron Microscopy (SEM)—note that the randomized execution makes it considerably harder even to find useful probing points compared to conventional designs.

Nevertheless, let us assume that an attacker would somehow find the encoding of an instruction $I_k$ and also uncover the mutation used for the instruction, $S_k$, and has access to the binary. The embodiment would still limit the information this attacker can extract to a few instructions, typically less than the size of a basic block (or secure zone). If the attacker tries to reverse engineer instructions going backwards in the address space from $I_k$, it would after a few instructions enter another secure zone based on a different encoding not related to the current uncovered mutation $S_k$ (because mutations are randomly picked for each secure zone). If the attacker were to try to go forward, he will always reach an ambiguous, e.g., register based, branch instruction at the end of the zone with a branch address that is defined in a previous secure zone and therefore protected.

The microarchitecture in the embodiment can also use static-instruction-based implicit branches that can be inserted in an earlier zone effectively replacing a conditional branch from the binary. Static instruction are control instructions containing control information of various sort. Implicit branching would mean that the control instruction would contain information for a branch at the end of the basic block often in addition to other information. This allows removing the actual branch instruction and completing the branch prediction ahead of time; encoding of the implicit branching can be made differ from the encoding of the safe zone where the branch it replaces normally resides. Secure zones end with an ambiguous unconditional branch with their target address defined in a different secure zone. This enables separation between the encoding used in zones and also creates a randomized layout. The performance overhead of the two branches per secure zone is mitigated by one of them often being an implicit branch, which is a zero-cycle branch in terms of execution because branch prediction is performed ahead of the control-flow it needs to encode.

The fact that application codes are based on secure zones increases the hurdles for an attacker because as many successful microprobings as secure zones would be required on many points to even have a chance to gain access to IP hidden in a processing core in this embodiment. The processing core in this embodiment has a number of techniques and a layered defense making this extremely difficult to attack.

First, each mutation has a very short lifetime of just a few cycles and is discarded after use (the next secure zone is at an unknown address that is ambiguous and will use a different random mutation key). This is not the case during instruction execution in a conventional processor where if the instructions are encrypted, the same key is used typically every time an instruction is decrypted.

Second, the very first mutation in this core is created at randomized times measured from reset -this is accomplished, e.g., by inserting random stalls during the initialization—and is implicit and chip-unique, re-generated at every power-on.

In addition, dynamic mutations (these are mutation instructions which are register-based with the register loaded from a memory-mapped IO location in a previous zone) can be correlated with either external or on-chip time-specific events—the attacker would need to capture those events and monitor many points simultaneously to have a chance to bypass the associated secure zones.

Protection against Reverse Engineering with RTL Simulation:

The attack in this scenario assumes accurate-enough extraction of the design such that an RTL-level simulation can be attempted where instructions can be executed and probed. The embodiment can protect against this attack similarly with a layered defense. First, a core in this embodiment requires comprehensive reverse engineering and additional factors would need to be true for an attacker to have a chance to succeed with simulation: conventional execution would not necessarily require a complete RTL model to simulate most of the instructions—a core in this embodiment would require that because its decoding/ISA of instructions in some secure zones, including the initial one, is tied to a comprehensive RTL state derived from many areas of the design and state that would normally not be required for instruction execution. Secondly, these cores use die-specific (due to process variation) circuits like [41] and similar techniques to make some of the encoding sequence invisible with invasive imaging alone, such as Scanning Electron Microscopy (SEM). Additional protection is introduced by adding a small persistent on-chip memory with its content filled at first power-on with the help of a non-deterministic hardware RNG. An attacker would need to be able to bypass these with microprobing and complete microsurgery to read content by generating the addresses, in addition to also successfully reverse-engineering the entire chip. After reverse engineering, a memory model would need to be constructed at the RTL level to simulate execution of instructions. One key aspect is that even if there is only a small discrepancy in the created RTL for the processor in this embodiment, the instructions would likely not decode at all as decoding is tied to a fairly accurate RTL state across the whole chip. This means that if there is a tamper-protection mechanism in place that would prohibit a fully accurate reverse engineering (even a very small fraction of the die), the RTL simulation would likely not work despite the other micro-probing requirements for a successful attack being all met.

The embodiment has additional defense enabled by its dynamic mutation instructions at the boundary between certain secure zones. These mutations are fine-grained core-external or die-specific; they are equivalent to execution authorizations required to enter certain zones, i.e., by allowing correct instruction decoding in those zones. If this authorization is externally provided and in a time-specific manner (e.g., by another sub-system), the RTL simulation would fail as it is considerably slower than the silicon chip, and as a result, the decoding of the instructions executing on the core would fail.

An attacker cannot use multiple chips to complete an attack. This is because there is no secret shared across the chips. That means that every chip would need to be attacked separately and information gained from one chip would not help in attacking any other chip.

Protection against Cloning: Cloning attacks would require copying the design transistor-by-transistor and associated software bit-by-bit. By executing a uniquely generated code, of which decoding is tied to chip or die-unique aspects, effective defense against cloning can be provided. Even if a chip incorporating a processing core such as described above would be replicated exactly at the transistor level and a copy of the software binary is available, the software would not run on the new chip and the chip would not function.

Embodiment 2: Protecting Cryptographic Implementations Against High-Order Differential Power Analysis An embodiment showing protecting a cryptographic implementation is shown below. As mentioned in the standard and noted in the Advanced Encryption Standard (AES) literature, AES is susceptible to differential power analysis (DPA) attacks.

The embodiment is based on a software-hardware approach; it is based on the microprocessor technology described earlier for randomization of execution and internal microprocessor switching activity. The objective is to provide high-order DPA protection with minimal area overhead and performance impact on AES.

AES is a round-based symmetric block cipher, working on 128 bit chunks of data. The AES algorithm is based on 4 different operations per round, as well as some pre- and post-processing. These operations are SubBytes, ShiftRows, MixColumn, and AddRoundKey. More details can be found in the standard outlining document.

One of the main concerns with the AES algorithm is its susceptibility to DPA attacks. Side-channel attacks, such as DPA, work due to the fact that correlation exists between physical measurements taken during execution and the internal state of the algorithm being executed.

Figure 4:
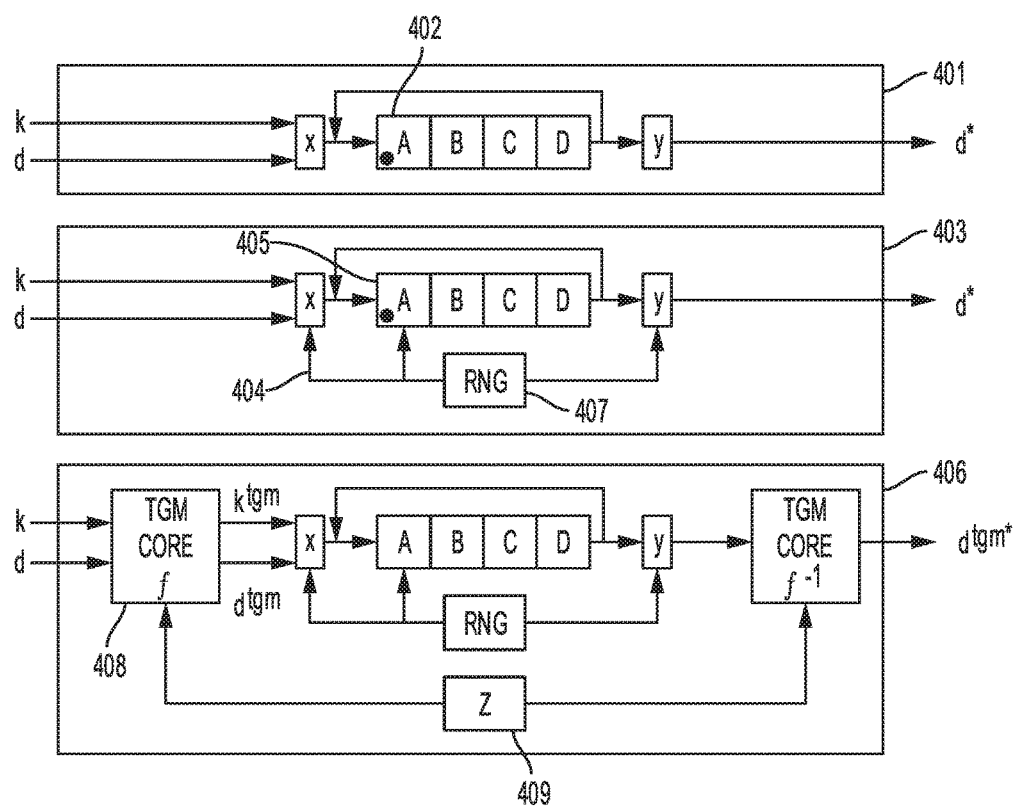
FIG. 4 shows a block level diagram of protecting an AES cryptographic implementation with security approach (detailed in embodiment 2).

In FIG. 4 a standard AES algorithm 401 is shown at the top. The microprocessor core with the techniques outlined in the patent, including randomization of encoding and execution, is referred to as TGM.

In the AES algorithm an attacker may target the time at which the input data and key are operated on for the first time (see highlighted point 402 in the figure). By monitoring the average power consumption at this point, a correlation can be made between the input data (known to the attacker) and the secret key, to eventually find the key. In order to combat this DPA attack, approaches based on masking the input data have been introduced. Data masking is used to remove the power-trace related correlation between the (known) input data and the data used in the algorithm with the key. Mask correction must be performed during the algorithm (as SBox lookups in the SubBytes stage are non-linear operations) to ensure that the masking will not affect the output cipher-text and that the cipher-text can still be decrypted with the same key. Although various approaches, based on either using separate SBox table(s) for each possible mask or by replacing the SBox lookup with logic to perform equivalent transformation, have been proposed and offer protection against first-order DPA, scaling such a solution to higher order DPA is extremely difficult.

See for example the middle implementation 403 in FIG. 4 that uses data masking: while it protects against first-order DPA it is vulnerable to second-order DPA at point 410. In a second-order DPA attack, the attacker monitors the power profile when the mask is exclusive-or-ed with the (known) input data. Capturing traces for both this point and the point when the masked data is used with the key in stage A is sufficient for an attacker to correlate the mask, the input data, and the secret key bit by bit.

The proposed third AES implementation 406 shown in the bottom sub-figure in FIG. 4 is leveraging the strength of TGM security core 408 that is based on an embodiment of the randomized encoding and execution approach.

During AES encryption the TGM calculates a reversible function, $f$, in software that takes as inputs the key, the data to be encrypted and a chip-unique random number Z shown as 409 (persistent across power-on cycles). The TGM execution is resistant to high-order DPA as switching activity in TGM buses, memory, etc, is randomized by the random encoding and execution model and by operation masking techniques presented before. Due to the high-order DPA protection in TGM that de-correlates data d from dtgm and key k from ktgm (see the bottom part of FIG. 4), the AES module is now protected against DPA.

The additional hardware masking is, in fact, not necessary, since the correlation between the original input data and the data worked on with the key has been removed in the TGM portion of the solution. The flow described above is for encryption; for decryption the initial TGM software layer would pass the data to block A and a TGM software layer will perform the inverse function of f on the data. Furthermore, any DPA would require running the AES in isolation or a modification of the code; however, as the TGM component of AES would not decode correctly without the execution of another secure zone before this code (which in turn requires another secure zone to be decoded and so on) and a modification of that code would essentially mean knowing all the decoding related mutations; a successful attack is therefore extremely unlikely. The performance impact of this scheme is minimal: the TGM-based functionality and the other stages of the AES can be pipelined. Assuming a 256-bit AES, with 16 rounds, the requirement for pipelining without penalty is that the TGM component is completed in less than 16 cycles, assuming each AES round takes one cycle without TGM.

Embodiment 3: Protecting Hardware Intellectual Property by Controlling with Security Processor An example is provided in the context of digital filters. Other types of hardware modules could be addressed in a similar way.

At the heart of modern processing and communication systems are digital filters (DF) that compute a quantized time-domain representation of the convolution of analog signals in digitized form. DFs can be found in almost any military system from avionic to sonar sub-systems and applications such as image recognition and target tracking. The characteristics (i.e. transfer function, amplitude response, etc.) of a DF can leak information about the intended function of the signal processing system to which it belongs, during both the manufacturing and the deployment of the ASIC.

To protect a DF, the key characteristics must be protected: this includes its type (i.e., whether it is IIR or FIR), order of filter (number of previous inputs and/or outputs used to calculate current output), filter coefficients (weighting function of the filter), and algorithm used to adaptively change the coefficients at runtime—if the DF is adaptive.

FIG. 5 (top, 501) shows typical implementations for an adaptive filtering algorithms. Filter coefficients 503 weigh the data shifted down the delay line and are responsible for, in conjunction with the number of taps (delays), the amplitude response of the filter. In a non-adaptive filter, the filter coefficients are generally pre-calculated and stored in non-volatile memory. In adaptive filters, an adaptive algorithm 502 computes these coefficients on the fly in response to changing input samples.

FIG. 5 (bottom figure) shows an example of how a DF can be protected with TGM. The task of selecting the coefficients in a non-adaptive DF, the algorithm to adaptively compute the coefficients 506 in an adaptive DF (shown as 505), and controlling the order of the coefficients are moved to the TGM core (see 504, 505); these signals are memory-mapped and controlled by secured TGM instructions. To control the programming of the order, support masking, and provide the ability to change on the fly we assume the availability of redundant taps. By transferring key computational steps and the configuration of the DF design to the TGM core, we can harden it against both online and offline attacks.

In a typical ASIC implementation the interconnection between the adders, multipliers, and delay elements in a DF is predetermined and can be reverse engineered through Scanning Electron Microscopy (SEM).

When the filter is used with the TGM core (implementing randomized encoding and execution), the interconnection is programmed at start-up and can be changed at regular intervals when the filter is in use. This prevents attackers from knowing how the taps are interconnected with respect to the input, output, and from establishing an order for the filter coefficients. In addition, to thwart micro-probing attacks based on FIB probes, the TGM part could implement coefficient masking: e.g., it can mask the actual filter coefficients sent to the filter hardware (a few at a time depending on the number of redundant taps) with randomly generated mask values in the TGM core.

To correct the error added to the weighting function of the DF (before it affects the output), the TGM software compensates the weight by altering the coefficients in the redundant taps of the filter accordingly. Masking ensures that the filter coefficients, even for a non-adaptive filter, change constantly, making it extremely difficult for an attacker to figure out whether the filter is adaptive or not or find the coefficients.

Other masking schemes are possible, e.g., resembling time-hopping, if the component following the DF would be similarly controlled by the TGM. A TGM solution enables occasional integrity checking on the DF hardware: the transfer function of the DF would be run in the TGM in parallel with the DF and outputs checked for matching. As integrity checking can lag the rate at which the hardware components of the DF process the input, the checking mechanism is not on the critical path of the DF.

Overview TGM Core Microarchitecture used in this embodiment: A TGM core is a 32-bit compiler-driven single-issue (or dual-issue) processor that supports 8-16-32-64-bit operations, has cryptographic hardware acceleration, and sophisticated compiler-driven power management. TGM uses both a hardware-based non-deterministic random number generator (NDRNG) and a deterministic random number generator (DRNG) that is FIPS 140-2 compliant. It has a physically-mapped compiler-managed memory system. It incorporates additional techniques to protect its data memory. The compiler maps each temporary memory access statically to a consumer-producer group called a location set; these are extracted by the compiler and/or rely on additional user information. As both memory reads and writes belonging to a location set would use the same obfuscation, correctness of execution is maintained. At runtime, random keys are read in and masking happens in the software uniquely for each location set. The masking varies after each power on. All persistent memory (on-chip as well as off-chip) is encrypted with a DPA-resilient AES.

Interfacing with Protected Design: An ASIC with built-in TGM might use an interface between the TGM core and the functionality it protects. The TGM core contains a programmable interface which allows software executing on the TGM core to interact with and control hardware components. Since it is possible that the protected hardware components and the TGM core may be operating at different clock speeds, communication between the two will occur via a handshaking protocol. This interface can contain programmable IO lines (similar to GPIO) and a special interrupt port through which the ASIC will be able to interrupt the current task being performed on the TGM in order to initiate a higher priority task.

Embodiment 4: Protecting Software Intellectual Property with Add-on Security Processor in Conventional Systems In this embodiment instructions on a second processor co-execute with instructions on the security processor. This security processor can be added on add-on card such as PCI, PCI-e, etc. The instructions executing on the security processor, such as TGM, could also be encrypted before sent for execution. By inserting an instruction of which encoding is randomly created, or encrypted, into the stream of instructions on a lesser security processor, such as with a fixed instruction set, the computer program running on a lesser security processor could be protected against reverse engineering and tampering attacks, also due to the voids created in to computer program now containing obfuscated codes executing on a security processor. The codes that execute on the security processor could be coupled with each other, forming a graph, for the purpose of protecting against replay attacks or removal attacks of some of the codes targeted to execute on the security processor.

OTHER EMBODIMENTS

The invention is not limited to the specific embodiments described herein. Other types of obfuscation or encryption can be used for instructions and data and combined with other techniques, in other embodiments. The invention can be used to implement other types of security services or functionality than described in the embodiments. Other embodiments not described herein are also within the scope of the following claims.

What is claimed is:

1. A method that is performed on a processing device, comprising:
    encoding blocks of instructions for a computer program differently to produce coded blocks of instructions that are part of a binary executable, the binary executable being based on the computer program, the blocks of instructions being encoded based on mutation instructions stored in memory, at least one of the mutation instructions to perform encoding based on a processing variation of a die containing the processing device;
    associating, with each coded block of instructions, control information to decode a corresponding coded block of instructions; and
    executing the binary executable on the processing device, wherein executing the binary executable comprises using the control information to decode the coded blocks of instructions.

2. The method of claim 1, wherein the blocks of instructions comprise all instructions in the computer program.

3. The method of claim 1, wherein the blocks of instructions comprise less than all instructions in the computer program.

4. The method of claim 1, wherein the coded blocks of instructions define an encoding for the computer program that is unique to the processing device.

5. The method of claim 1, wherein at least one of the mutation instructions is configured to encode a block of instructions based on hardware contained on the processing device.

6. The method of claim 1, wherein at least one of the mutation instructions is configured to encode a block of instructions based on how a payload contained in the block of instructions is to be interpreted.

7. The method of claim 1, wherein at least one of the mutation instructions is configured to encode a first block of instructions based on information stored in a second block of instructions that is different from the first block of instructions.

8. The method of claim 1, wherein at least one of the mutation instructions is configured to encode a block of instructions based on information stored in a storage location that is remote from the block of instructions.

9. The method of claim 1, wherein at least one of the mutation instructions is configured to encode a block of instructions by obfuscating one or more addresses in the block of instructions.

10. The method of claim 1, wherein an order of the coded blocks of instructions in the binary executable is different from an order of corresponding instructions in the computer program.

11. A system comprising:
    machine storage storing a compiler that is executable to perform operations comprising:
        encoding blocks of instructions for a computer program differently to produce coded blocks of instructions that are part of a binary executable, the binary executable being based on the computer program, the blocks of instructions being encoded based on mutation instructions stored in memory, at least one of the mutation instructions to perform encoding based on a processing variation of a die containing the processing device; and
        associating, with each coded block of instructions, control information to decode a corresponding coded block of instructions; and
    hardware to execute the binary executable, wherein executing the binary executable comprises using the control information to decode the coded blocks of instructions.

12. The system of claim 11, wherein the hardware comprises a decoder to decode the coded blocks of instructions using the control information.

13. The system of claim 11, wherein the blocks of instructions comprise all instructions in the computer program.

14. The system of claim 11, wherein the blocks of instructions comprise less than all instructions in the computer program.

15. The system of claim 11, wherein the coded blocks of instructions define an encoding for the computer program that is unique to the processing device.

16. The system of claim 11, wherein at least one of the mutation instructions is configured to encode a block of instructions based on components contained on the processing device.

17. The system of claim 11, wherein at least one of the mutation instructions is configured to encode a block of instructions based on how a payload contained in the block of instructions is to be interpreted.

18. The system of claim 11, wherein at least one of the mutation instructions is configured to encode a first block of instructions based on information stored in a second block of instructions that is different from the first block of instructions.

19. The system of claim 11, wherein at least one of the mutation instructions is configured to encode a block of instructions based on information stored in a storage location that is remote from the block of instructions.

20. The system of claim 11, wherein at least one of the mutation instructions is configured to encode a block of instructions by obfuscating one or more addresses in the block of instructions.

21. The system of claim 11, wherein an order of the coded blocks of instructions in the binary executable is different from an order of corresponding instructions in the computer program.

22. The system of claim 11, wherein the processing device is a component of a mobile device.

23. A processing device comprising:
    machine storage storing a compiler that is executable to perform operations comprising:
        encoding instructions for a computer program in a way that is unique to the processing device to produce coded instructions that are part of a binary executable, the binary executable being based on the computer program, the instructions being encoded based on a processing variation of a die containing the processing device or based on a randomly-generated number stored in memory on the processing device at power-on;
        associating, with the coded instructions, corresponding control information to decode the coded instructions; and
    microarchitecture to execute the binary executable on the processing device, wherein executing the binary executable comprises using the control information to decode the coded instructions.

24. The processing device of claim 23, wherein the processing variation of the die corresponds to memory access latency of the processing device.

25. The processing device of claim 23, wherein the coded instructions comprise multiple secure zones, each secure zone ending in an ambiguous branch instruction.

26. The processing device of claim 23, wherein the coded instructions comprise multiple blocks of instructions, the multiple blocks of instructions being in a different order in the coded instructions than corresponding instructions in the computer program.

27. The processing device of claim 23, wherein the microarchitecture is configured to switch on one or more arithmetic and logic units in the processing device during executing the binary executable when an instruction being executed does not use the one or more arithmetic and logic units.

28. The processing device of claim 23, wherein the microarchitecture is configured to replace operations with software interrupts during executing the binary executable in order to change a power profile of the processing device.

29. A method performed by a processing device, comprising:
encoding instructions for a computer program in a way that is unique to the processing device to produce coded instructions that are part of a binary executable, the binary executable being based on the computer program, the instructions being encoded based on a processing variation of a die containing the processing device or based on a randomly-generated number stored in memory on the processing device at power-on;
associating, with the coded instructions, corresponding control information to decode the coded instructions; and
executing the binary executable on microarchitecture of the processing device, wherein executing the binary executable comprises using the control information to decode the coded instructions.

30. The method of claim 29, wherein the processing variation of the die corresponds to memory access latency of the processing device.

31. The method of claim 29, wherein the coded instructions comprise multiple secure zones, each secure zone ending in an ambiguous branch instruction.

32. The method of claim 29, wherein the coded instructions comprise multiple blocks of instructions, the multiple blocks of instructions being in a different order in the coded instructions than corresponding instructions in the computer program.

33. The method of claim 29, further comprising:
switching on one or more arithmetic and logic units in the processing device during executing the binary executable including when an instruction being executed does not use the one or more arithmetic and logic units.

34. The method of claim 29, further comprising:
replacing operations with software interrupts during executing the binary executable in order to change a power profile of the processing device.

* * * * *